United States Patent
You et al.

(10) Patent No.: US 11,683,705 B2
(45) Date of Patent: Jun. 20, 2023

(54) METHOD OF MONITORING PHYSICAL DOWNLINK CONTROL CHANNEL AND AN APPARATUS USING THE SAME

(71) Applicant: LG ELECTRONICS INC., Seoul (KR)

(72) Inventors: Hyangsun You, Seoul (KR); Sukhyon Yoon, Seoul (KR); Joonkui Ahn, Seoul (KR); Hyunsoo Ko, Seoul (KR); Seonwook Kim, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 17/035,570

(22) Filed: Sep. 28, 2020

(65) Prior Publication Data

US 2021/0099898 A1 Apr. 1, 2021

(30) Foreign Application Priority Data

Sep. 26, 2019 (KR) .................... 10-2019-0118688

(51) Int. Cl.
*H04W 72/23* (2023.01)
*H04W 24/08* (2009.01)
*H04W 72/0453* (2023.01)
*H04W 72/0446* (2023.01)
*H04W 76/11* (2018.01)
(Continued)

(52) U.S. Cl.
CPC ....... *H04W 24/08* (2013.01); *H04W 72/0446* (2013.01); *H04W 72/0453* (2013.01); *H04W 72/23* (2023.01); *H04W 72/53* (2023.01); *H04W 76/11* (2018.02); *H04W 72/1263* (2013.01)

(58) Field of Classification Search
CPC ............... H04W 24/08; H04W 72/042; H04W 72/0446; H04W 72/0453; H04W 72/0493; H04W 72/14; H04W 76/11; H04W 72/1289; H04W 72/1273; H04W 72/1284; H04W 72/1263; H04W 72/20; H04W 72/1215; H04L 5/0053
See application file for complete search history.

(56) References Cited

U.S. PATENT DOCUMENTS 10,951,383 B2 * 3/2021 Lu .................... H04L 5/0094
2020/0008231 A1 * 1/2020 Vilaipornsawai ...... H04B 7/024
(Continued)

OTHER PUBLICATIONS

Kwak et al., "Uplink Operations of Multi-TRP and PANEL", U.S. Appl. No. 62/842,319, filed May 2, 2019 (Year: 2019).*
(Continued)

*Primary Examiner* — Thinh D Tran
(74) *Attorney, Agent, or Firm* — Lee Hong Degerman Kang Waimey

(57) ABSTRACT

Provided are a method and apparatus for monitoring a physical downlink control channel (PDCCH) of a user equipment (UE) in a wireless communication system. The method includes receiving information which reports one configuration among a plurality of configurations related to the PDCCH monitoring through a first transmit-receive point (TRP), and performing the PDCCH monitoring, based on the one configuration. The one configuration reports a combination of a resource pattern index and a PDCCH control resource set (CORESET) index. The one configuration may be for a second TRP.

17 Claims, 29 Drawing Sheets

(51) Int. Cl.
*H04W 72/53* (2023.01)
*H04W 72/1263* (2023.01)

(56) References Cited

U.S. PATENT DOCUMENTS

| | | | | |
|---|---|---|---|---|
| 2020/0154467 A1* | 5/2020 | Gong | .................... | H04W 76/11 |
| 2020/0221485 A1* | 7/2020 | Cirik | ................... | H04W 72/042 |
| 2020/0313836 A1* | 10/2020 | Kang | .................... | H04W 16/10 |
| 2020/0351129 A1* | 11/2020 | Kwak | ............... | H04W 72/0493 |
| 2020/0404586 A1* | 12/2020 | Zhang | ................... | H04W 24/08 |
| 2022/0052828 A1* | 2/2022 | Yiu | ........................ | H04W 76/28 |
| 2022/0338222 A1* | 10/2022 | Kim | .......................... | H04L 1/00 |

OTHER PUBLICATIONS

Cirik et al., "Prioritization in Downlink Beam Management", U.S. Appl. No. 62/790,317, filed Jan. 9, 2019 (Year: 2019).*
LG Electronics, "Draft SID on flexible UL-DL Resource Allocation and Interference Mitigation," 3GPP TSG RAN Meeting #84, RP-191294, Newport Beach California, USA, Jun. 3-6, 2019, 4 pages.
LG Electronics, "Motivation of flexible UL-DL Resource Allocation and Interference Mitigation," 3GPP TSG RAN Meeting #84, RP-191295, Newport Beach California, USA, Jun. 3-6, 2019, 5 pages.

* cited by examiner

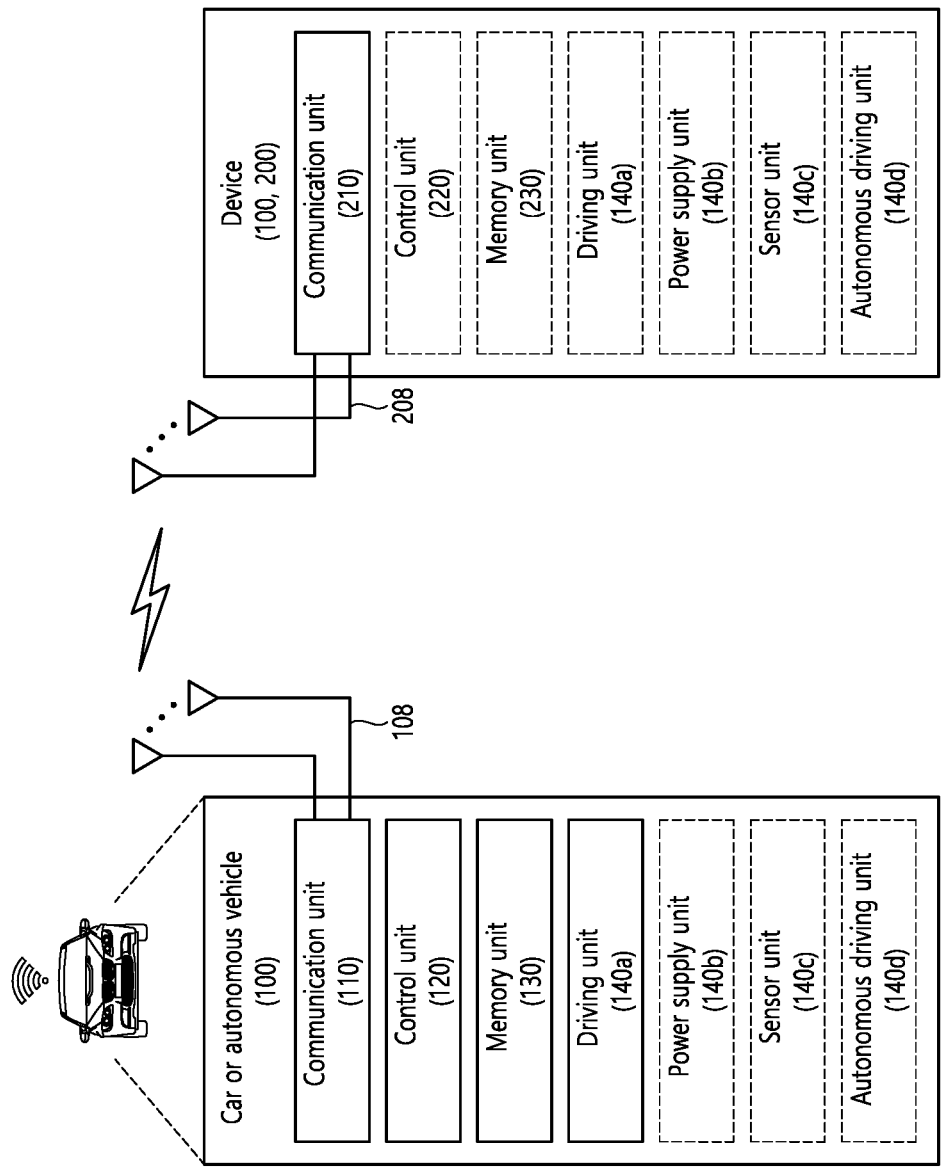

METHOD OF MONITORING PHYSICAL DOWNLINK CONTROL CHANNEL AND AN APPARATUS USING THE SAME

CROSS-REFERENCE TO RELATED APPLICATIONS

Pursuant to 35 U.S.C. § 119 (a), this application claims the benefit of earlier filing date and right of priority to Korean Patent Application No. 10-2019-0118688 filed on Sep. 26, 2019, the contents of which are hereby incorporated by reference herein in their entirety.

BACKGROUND OF THE DISCLOSURE

Field of the Disclosure

The present disclosure relates to a method of monitoring a physical downlink control channel in a wireless communication system, and an apparatus using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience. NR is also called the fifth generation (5G) system.

In NR, a plurality of transmit-receive points (TRPs) having the same cell identity (ID) may perform communication with one user equipment (UE). In this case, the plurality of TRPs may have different resource allocations. The UE may need an operation of switching the TRP, such as performing communication with a second TRP while performing communication with a first TRP. In this case, there is a need for a method and apparatus for indicating a TRP switching operation and monitoring a control channel in a changed TRP.

SUMMARY OF THE DISCLOSURE

The present disclosure provides a method of monitoring a physical downlink control channel in a wireless communication system, and an apparatus using the method.

In one aspect, provided is a method of monitoring a physical downlink control channel (PDCCH) of a user equipment (UE) in a wireless communication system. The method includes receiving information which reports one configuration among a plurality of configurations related to the PDCCH monitoring and performing the PDCCH monitoring, based on the one configuration. The one configuration reports a combination of a resource pattern index and a PDCCH control resource set (CORESET) index. The resource pattern index reports a location of an uplink resource and downlink resource, and the PDCCH CORESET index reports a CORESET for performing the PDCCH monitoring. The PDCCH monitoring is performed in the CORESET in the downlink resource.

In another aspect, provided is a user equipment (UE). The UE includes a transceiver transmitting and receiving a radio signal and a processor operatively coupled with the transceiver. The processor is configured to: receive information which reports one configuration among a plurality of configurations related to physical downlink control channel (PDCCH) monitoring and perform the PDCCH monitoring, based on the one configuration. The one configuration reports a combination of a resource pattern index and a PDCCH control resource set (CORESET) index.

In still another aspect, provided is a method of transmitting a PDCCH of an apparatus in a wireless communication system. The method includes transmitting information which reports one configuration among a plurality of configurations related to PDCCH monitoring and transmitting the PDCCH, based on the one configuration. The one configuration reports a combination of a resource pattern index and a PDCCH control resource set (CORESET) index.

In still another aspect, provided is an apparatus. The apparatus includes a transceiver transmitting and receiving a radio signal and a processor operatively coupled with the transceiver. The processor is configured to: transmit information which reports one configuration among a plurality of configurations related to PDCCH monitoring and transmit the PDCCH, based on the one configuration. The one configuration reports a combination of a resource pattern index and a PDCCH control resource set (CORESET) index.

In still another aspect, provided is at least one computer readable medium (CRM) having an instruction to be executed by at least one processor to perform operations includes: receiving information which reports one configuration among a plurality of configurations related to the PDCCH monitoring and performing the PDCCH monitoring, based on the one configuration. The one configuration reports a combination of a resource pattern index and a PDCCH control resource set (CORESET) index.

In still another aspect, provided is an apparatus of a wireless communication system. The apparatus includes a processor and a memory coupled with the processor. The processor is configured to receive information which reports one configuration among a plurality of configurations related to the PDCCH monitoring, and perform the PDCCH monitoring, based on the one configuration, wherein the one configuration reports a combination of a resource pattern index and a PDCCH control resource set (CORESET) index.

In a situation where there are a plurality of transmit-receive points (TRPs) having the same cell identity (ID) and each TRP has an independent semi-static U/D resource allocation, an appropriate semi-static U/D resource allocation can be provided to a user equipment (UE), and a change (switching) to a TRP having the appropriate semi-static U/D resource allocation can be implicitly reported. Since the appropriate U/D resource allocation can be provided to the UE without an increase in a signaling overhead for explicitly indicating a TRP change, efficiency of resource utilization can be increased, and a throughput can also be increased.

BRIEF DESCRIPTION OF THE DRAWINGS

FIG. 29 illustrates a vehicle or an autonomous vehicle applicable to the present specification.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
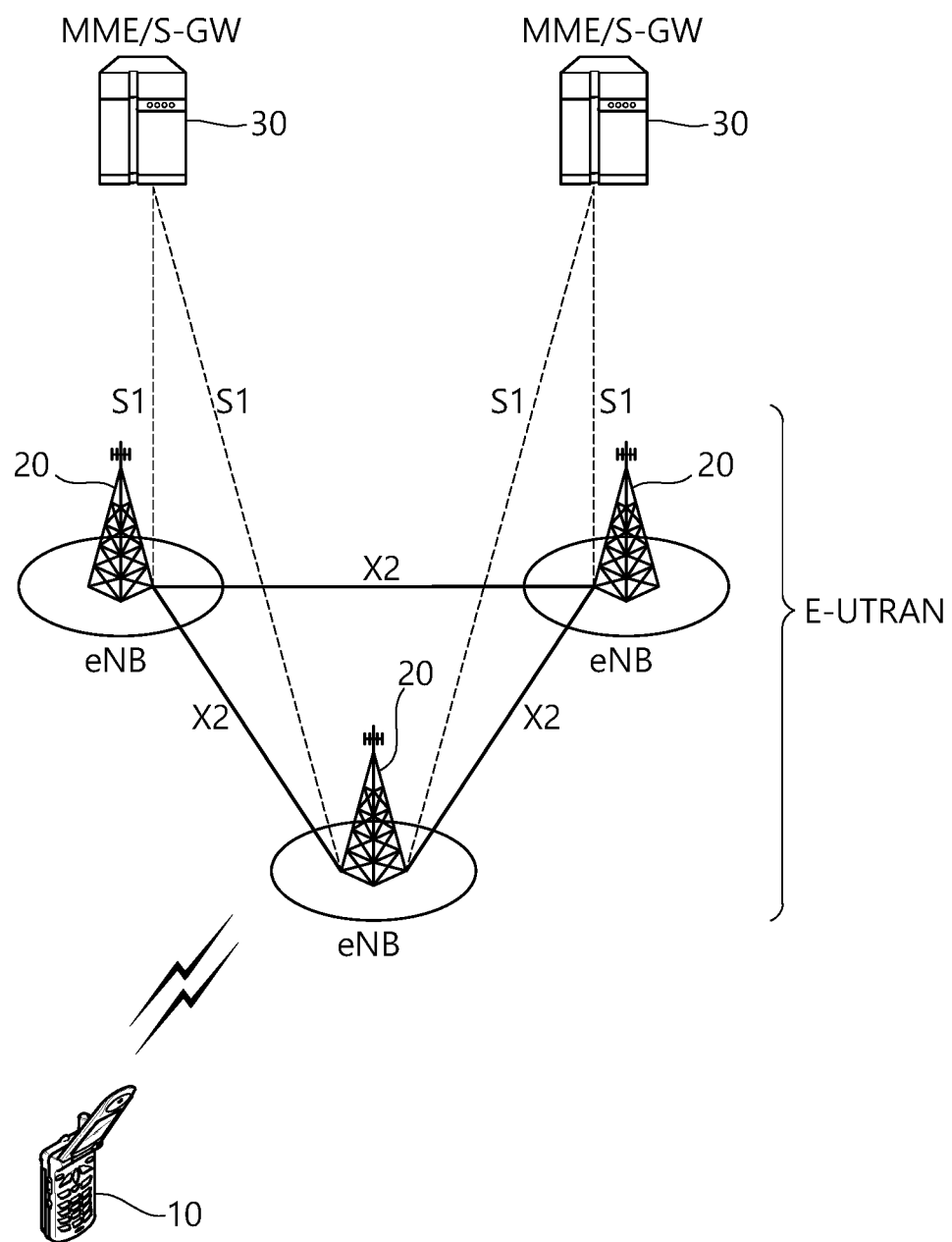
FIG. 1 shows a wireless communication system.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
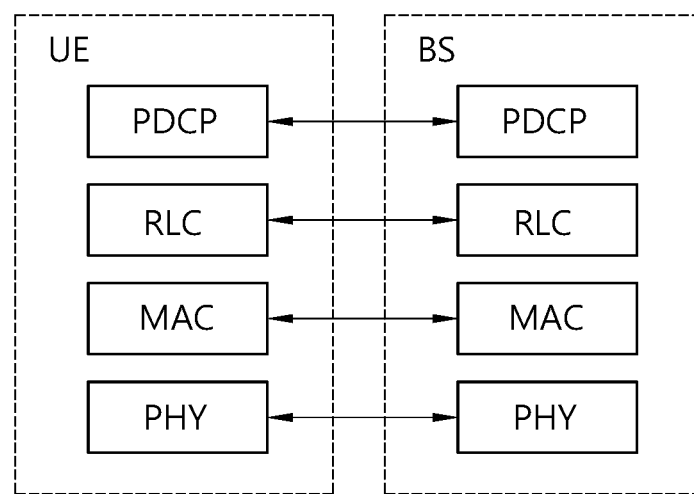
FIG. 2 is a diagram showing a wireless protocol architecture for a user plane.
Figure 3:
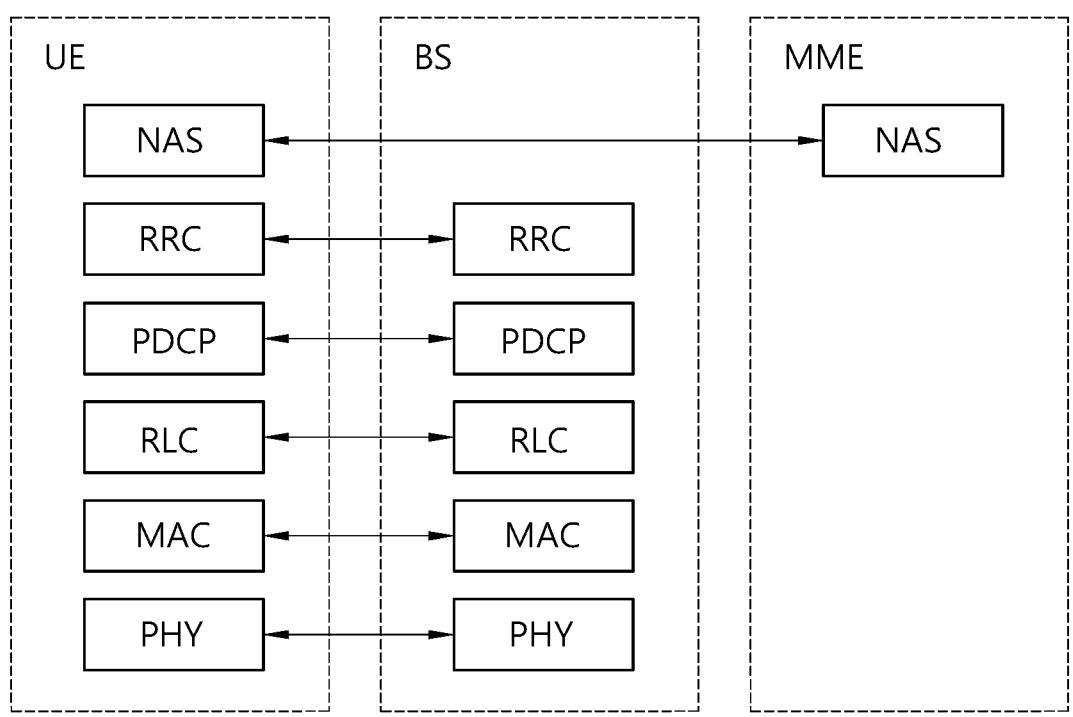
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
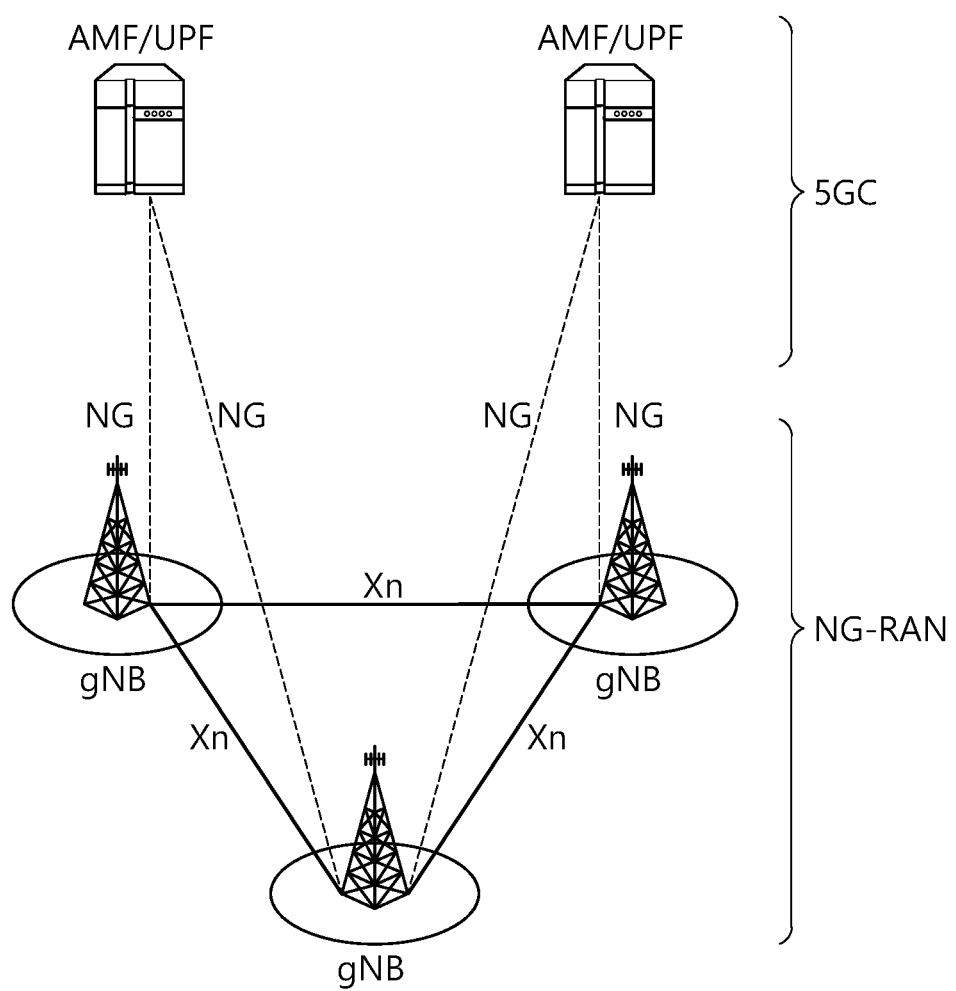
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
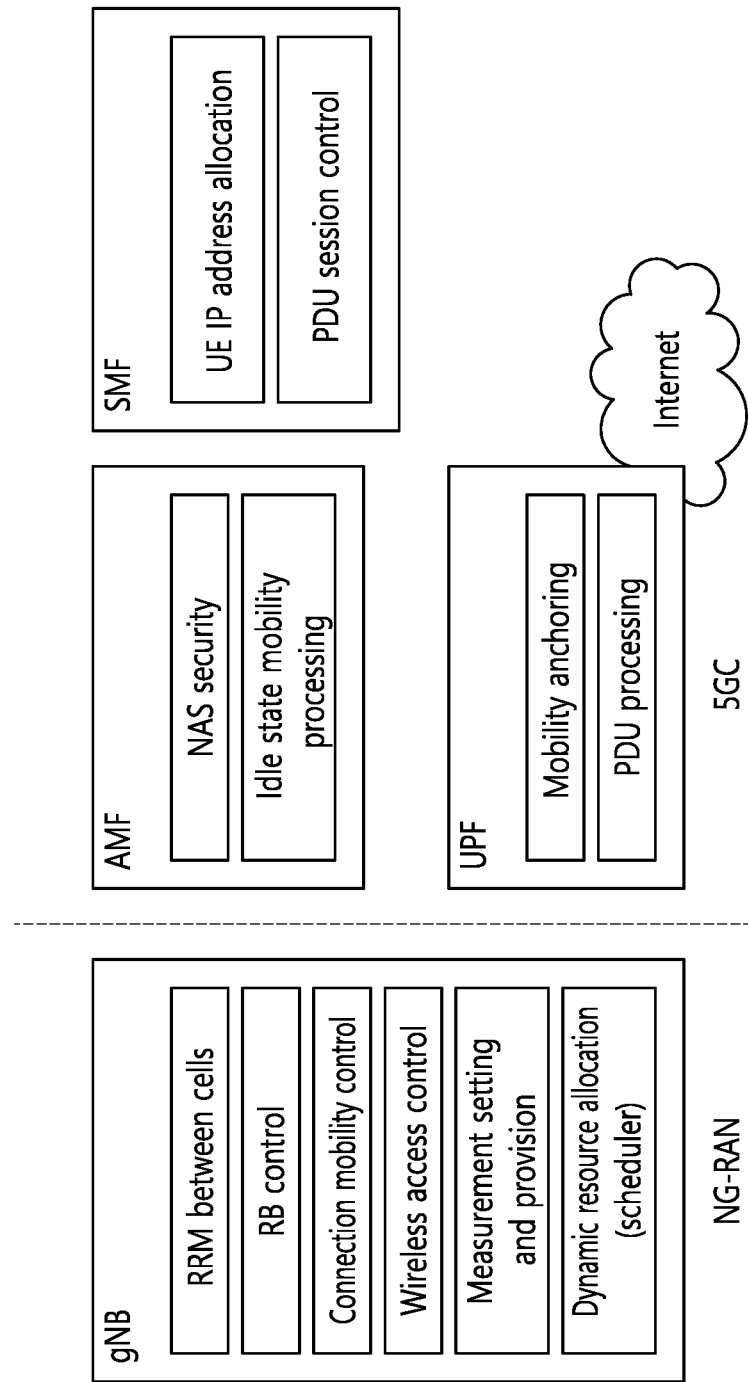
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
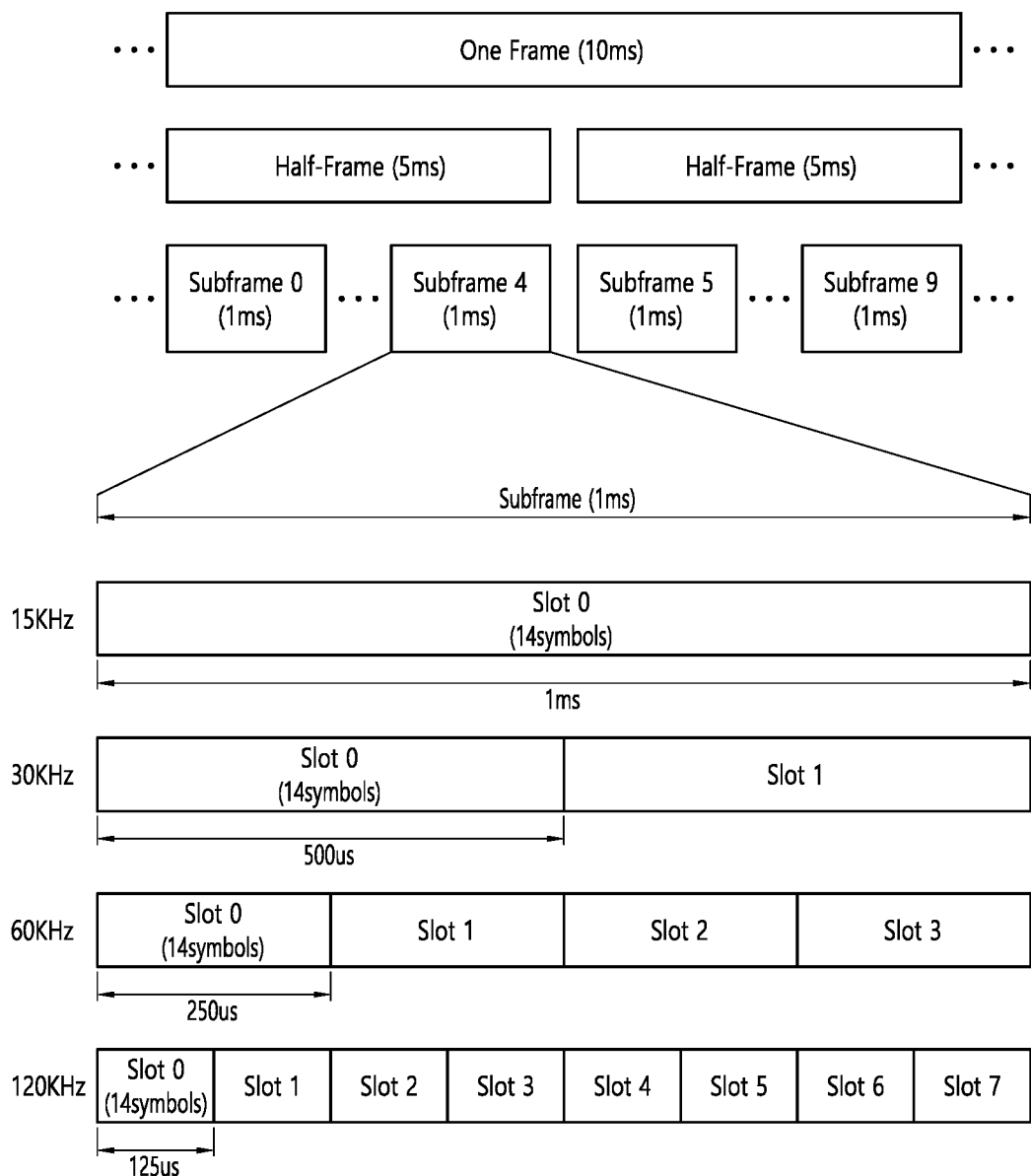
FIG. 6 illustrates an example of a frame structure that may be applied in NR.

FIG. 6 illustrates an example of a frame structure that may be applied in NR.

Referring to FIG. 6, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal |
| 3 | 120 | Extended normal |
| 4 | 240 | normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 illustrates a case of μ=0, 1, 2, 3.

Table 2-1 below illustrates that the number of symbols per slot, the number of slots per frame, and the number of slots per subframe vary depending on the SCS, in case of using an extended CP.

TABLE 2-1

| μ | $N^{slot}_{symb}$ | $N^{frame,u}_{slot}$ | $N^{subframe,u}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
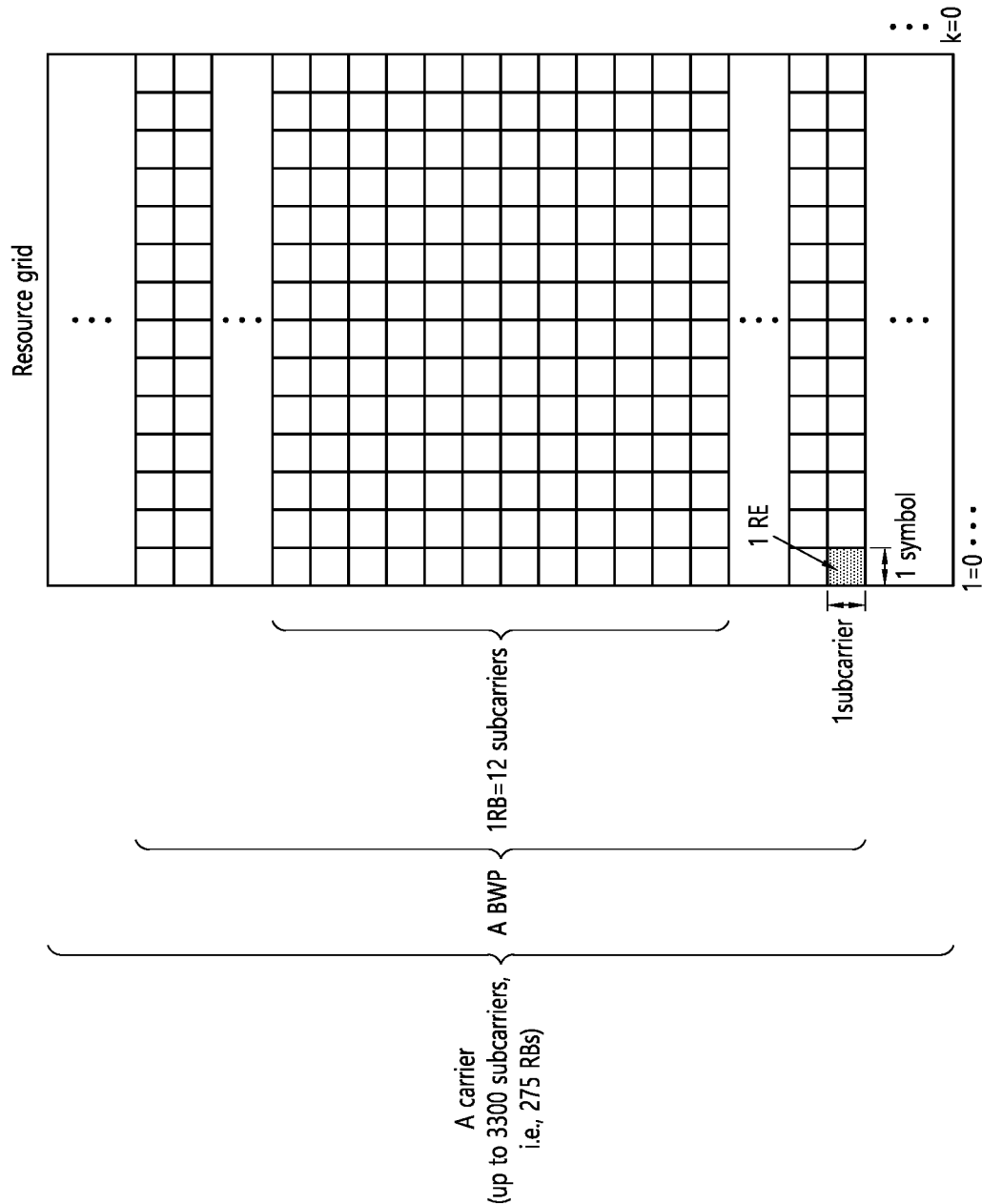
FIG. 7 illustrates a slot structure of an NR frame.

FIG. 7 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 8:
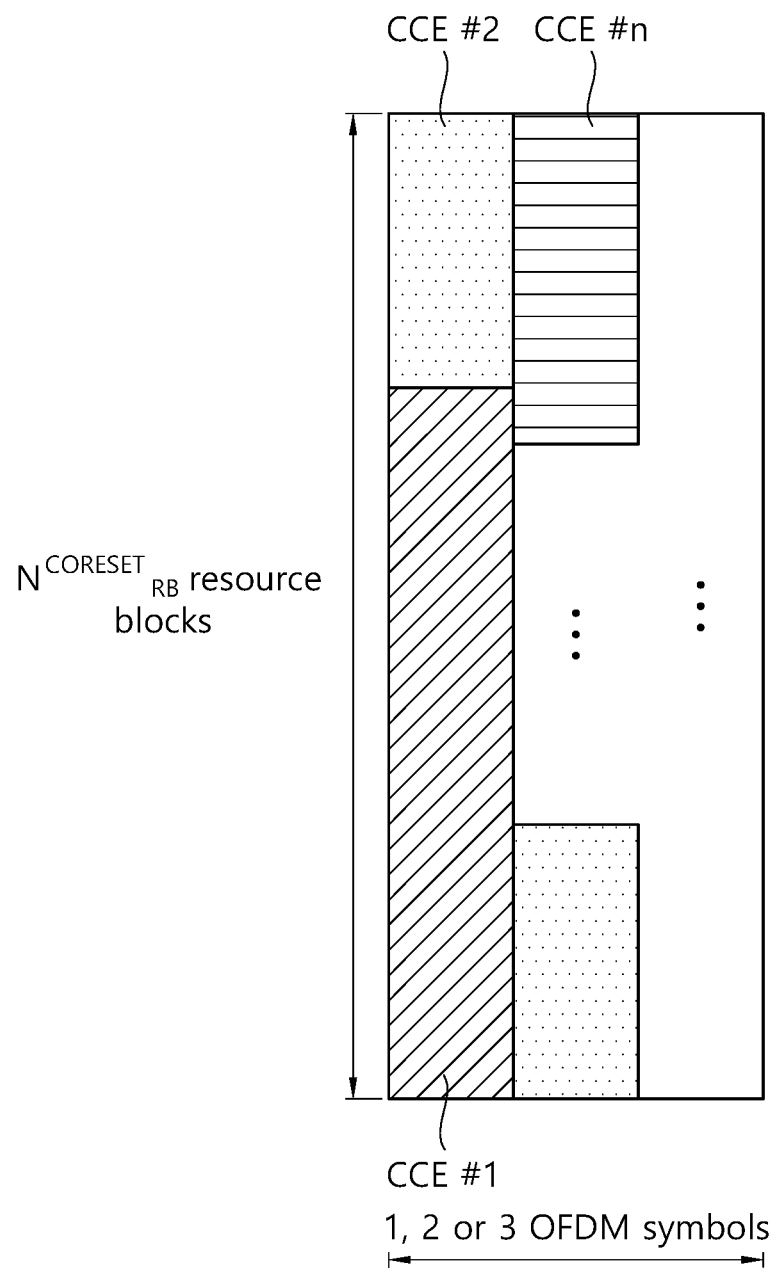
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 9:
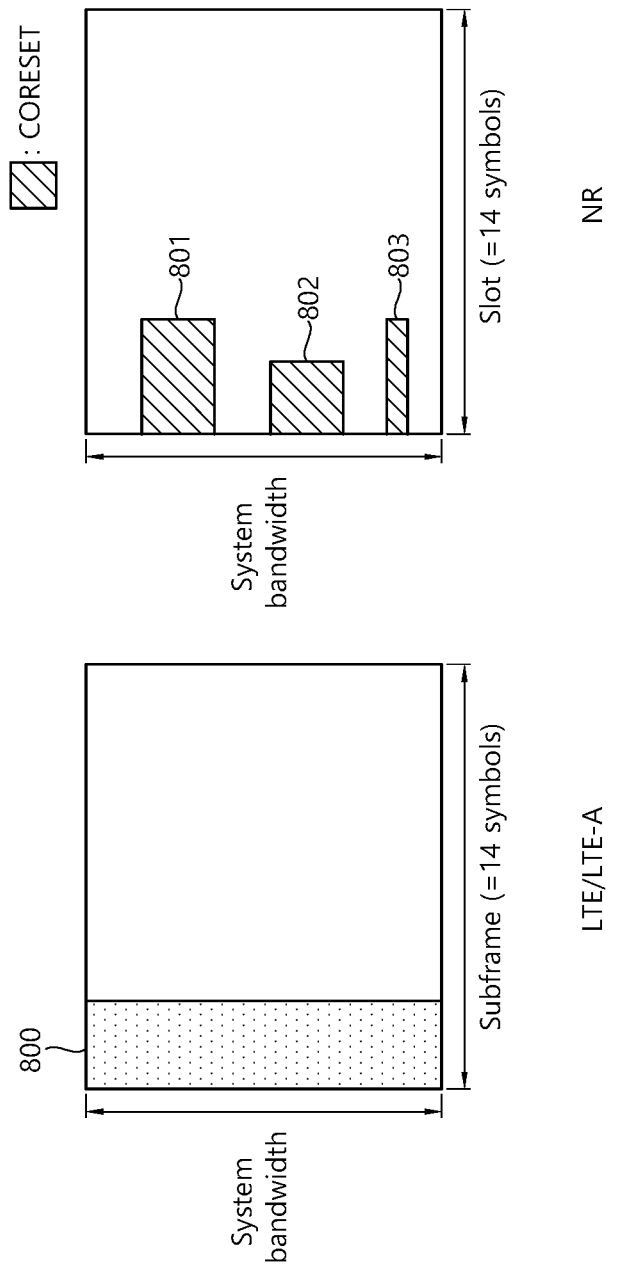
FIG. 9 is a diagram illustrating a difference between a related art control region and the CORESET in NR.

FIG. 9 is a diagram illustrating a difference between a related art control region and the CORESET in NR.

Referring to FIG. 9, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORE-SET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
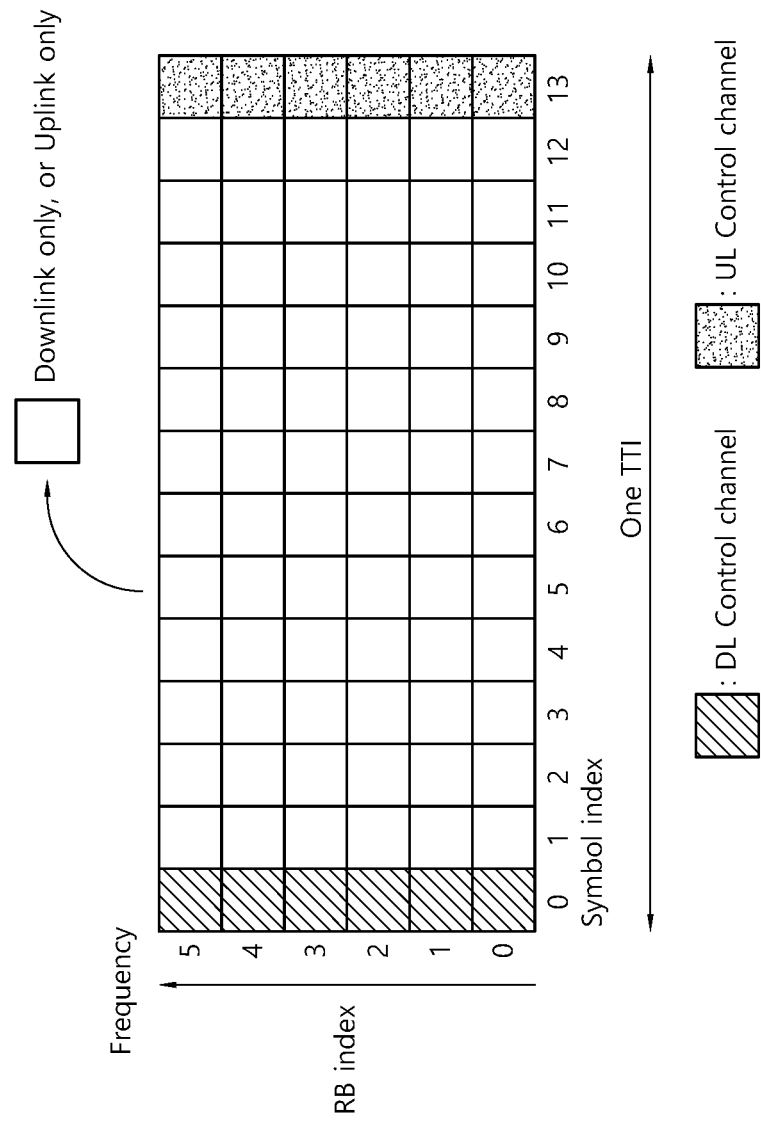
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 11:
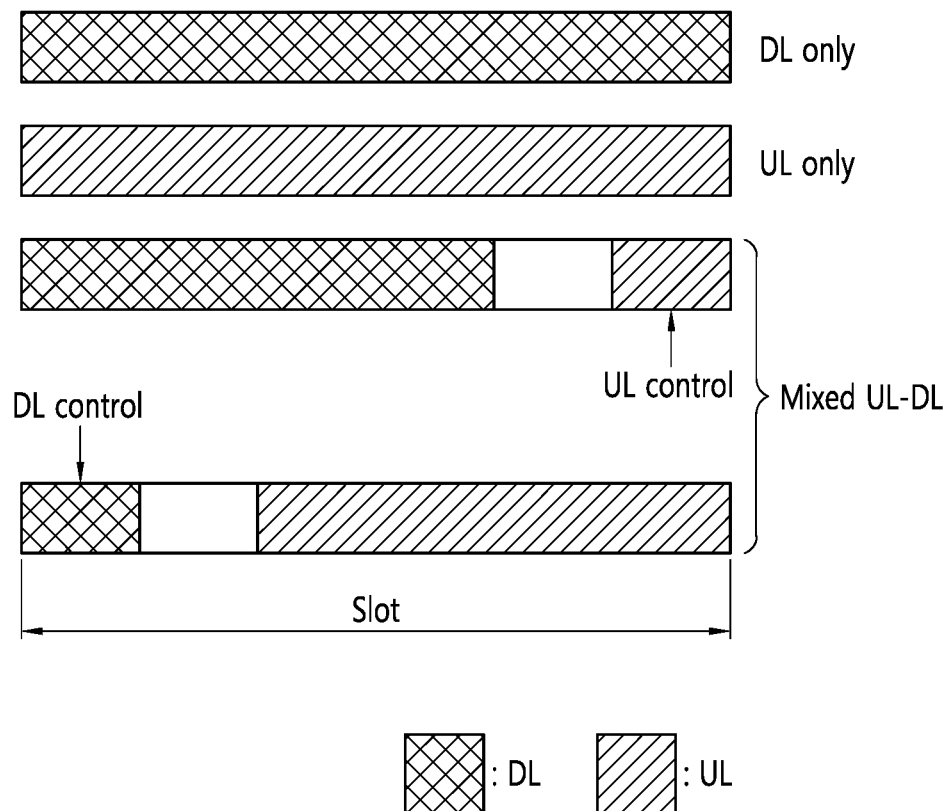
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDDCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
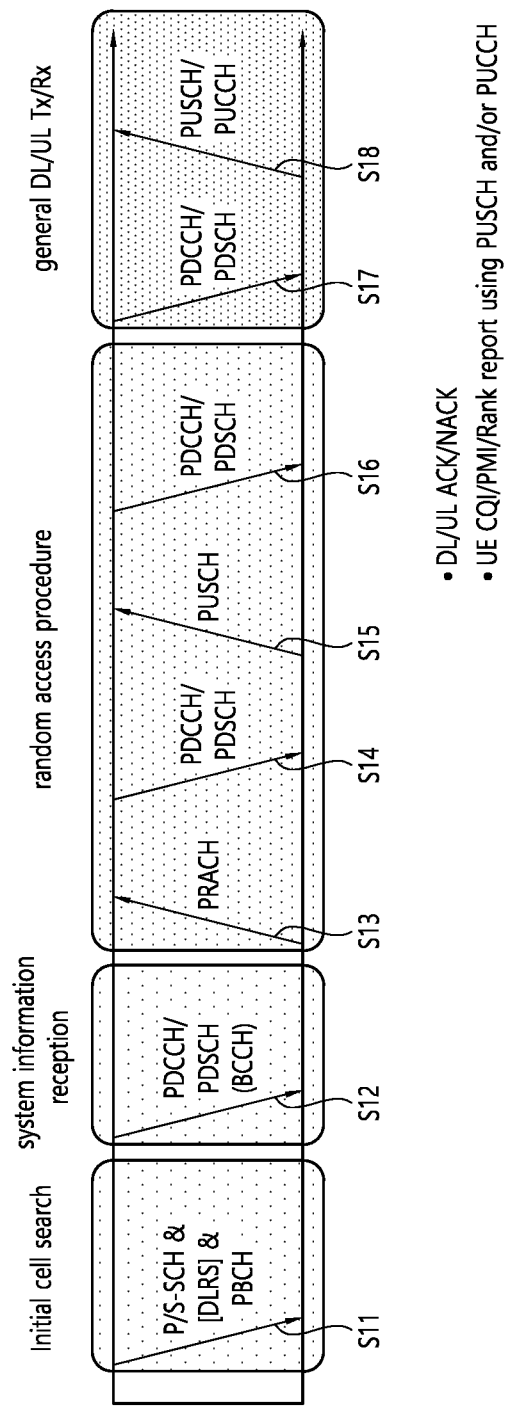
FIG. 12 illustrates physical channels and typical signal transmission.

FIG. 12 illustrates physical channels and typical signal transmission.

Referring to FIG. 12, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (HACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Figure 13:
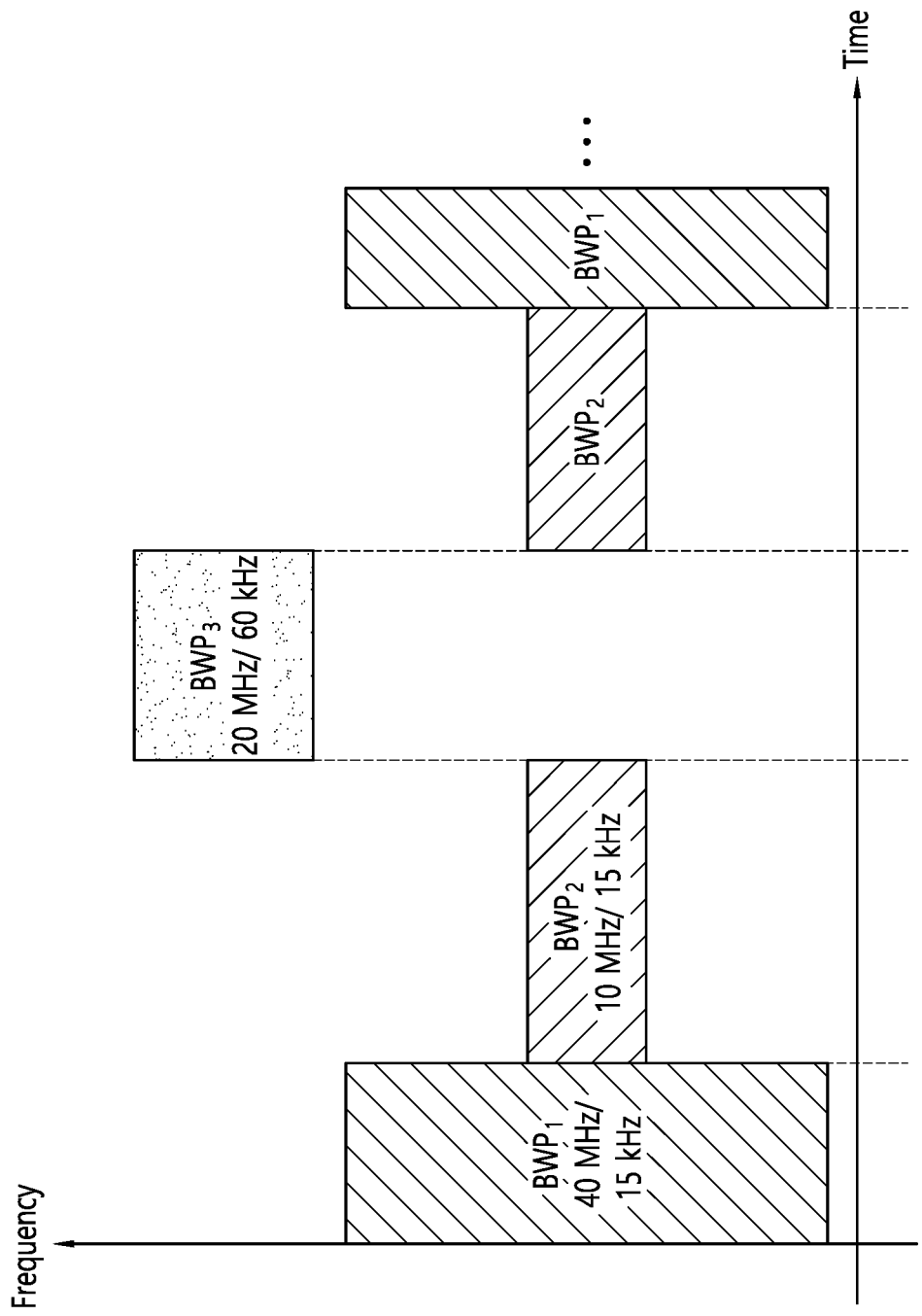
FIG. 13 illustrates a scenario in which three different bandwidth parts are configured.

FIG. 13 illustrates a scenario in which three different bandwidth parts are configured.

FIG. 13 shows an example in which $BWP_1$, $BWP_2$, and $BWP_3$ are configured on a time-frequency resource. The $BWP_1$ may have a width of 40 MHz and a subcarrier spacing of 15 kHz. The $BWP_2$ may have a width of 10 MHz and a subcarrier spacing of 15 kHz. The $BWP_3$ may have a width of 20 MHz and a subcarrier spacing of 60 kHz. In other words, each BWP may have a different width and/or a different subcarrier spacing.

Now, the present disclosure is described.

Although a dynamic TDD configuration is designed in the existing standard (e.g., NR, Rel-15), there is an example in which only a static TDD configuration (i.e., DL:UL=4:1) is commercialized in practice. For a preferred base station/cell deployment scenario, only the static TDD configuration is allowed to prevent interference between several operators within the same band. However, for a specific usage case (e.g., factory automation, etc.) and other purposes (e.g., UL capacity enhancement, etc.), there is a need to apply more flexible UL/DL resource allocations.

In addition, although a UE-specific TDD configuration is designed in the existing standard (e.g., NR, Rel-15), only a single TDD configuration may be assumed for each cell in the future standard (e.g., NR, Rel-16). However, when various types of traffic exist in the cell (e.g., DL heavy eMBB, UL heavy eMBB, URLLC, etc.), a network shall be capable of flexibly allocating resources to satisfy required traffic. As one of candidate solutions for this, full duplex radio (FDR) may be considered. In addition, it is also possible to operate 'multiple transmit-receive points (TRPs) having the same cell ID based on ideal backhaul' in which a UL/DL resource allocation is possible for each TRP.

Based on this discussion, it is possible to consider improvement in a flexible TDD configuration.

TRPs having the same cell ID (ideal backhaul) may be an important factor/scenario for operating flexible UL/DL resource utilization. In this scenario, a network may operate to dynamically allocate a UL/DL resource for each TRP according to a traffic situation. However, cross link interference (CLI) may be a bottleneck of performance. When a UL/DL resource is dynamically allocated for each TRP, for example, a resource allocated to downlink in a first TRP may be allocated to uplink in a second TRP. In this case, a first UE which receives a downlink signal from the first TRP may be interfered by a second UE which transmits an uplink signal to the second TRP. This may be called UE-to-UE interference. Likewise, downlink transmission of a specific TRP may interfere with uplink reception of another TRP, and this may be called TRP-to-TRP interference. Interference occurring between uplink and downlink as such is called CLI, and a scheme for mitigating the CLI shall be applied.

As one of candidate solutions for CLI mitigation, a CLI measurement and reporting may be considered between UEs of NR Rel-16. However, since the CLI measurement and reporting of NR Rel-16 is operated in a semi-static manner, it may not be appropriate to operate a dynamic UL/DL resource allocation for each TRP in a cell. Instead, faster CLI measurement and reporting techniques (e.g., L1 level measurement and reporting) may be required.

At present, TDD-UL-DL-ConfigCommon may be configured in a UE through system information (SI) in an NR system, which may be equally applied to all UEs in the same cell with a cell-specific UL/DL resource allocation. TDD-UL-DL-ConfigDedicated may be configured in the UE through RRC. This is a UE-specific UL/DL resource allocation, and a resource direction is configured in a UE-specific manner for a resource allocated with a flexible resource through the TDD-UL-DL-ConfigCommon. Thereafter, the resource direction may be configured dynamically for a resource configured as a flexible resource through the TDD-UL-DL-ConfigCommon and/or the TDD-UL-DL-ConfigDedicated by using slot format indication-downlink control information (SFC-DCI, for example, DCI format 2-0). The DCI format 2-0 is downlink control information used to report a slot format, a channel occupancy time (COT) interval, an available resource block set, search space set group switching, or the like.

In this case, there may be an environment in which a plurality of TRPs having the same cell ID exist for the purpose of cell coverage enhancement, coordinated multipoint (CoMP), throughput improvement of a specific region, or the like. Different TRPs having the same cell ID may use the same TDD-UL-DL-ConfigCommon, and may use the same TDD-UL-DL-ConfigDedicated for the same UE. In this case, the TRPs have the same semi-static UL/DL resource allocation for a specific UE, and a resource direction may be dynamically allocated for a region configured of a flexible resource in the semi-static UL/DL resource allocation of the UE.

When UEs having different traffic directions co-exist in one TRP, it may be ineffective for one TRP to simultaneously support these UEs. For example, in terms of transmission for decreasing latency, it is preferable that a resource allocation in which there are many UL resources (this is called UL heavy) is provided to a UE which needs to transmit UL traffic, and a resource allocation in which there are many DL resources (this is called DL heavy) is provided to a UE which needs to receive DL traffic. Since one TRP cannot perform DL transmission and UL reception at the same time, UL traffic reception and DL traffic transmission shall be performed in different time domains.

Meanwhile, there are a plurality of TRPs having the same cell ID, and each TRP may have a different UL/DL resource allocation for the same UE. While the first TRP has a UL-heavy resource allocation to serve a first UE having a lot of UL traffic, the second TRP may have a DL-heavy resource allocation to serve a second UE having a lot of DL traffic.

Figure 14:
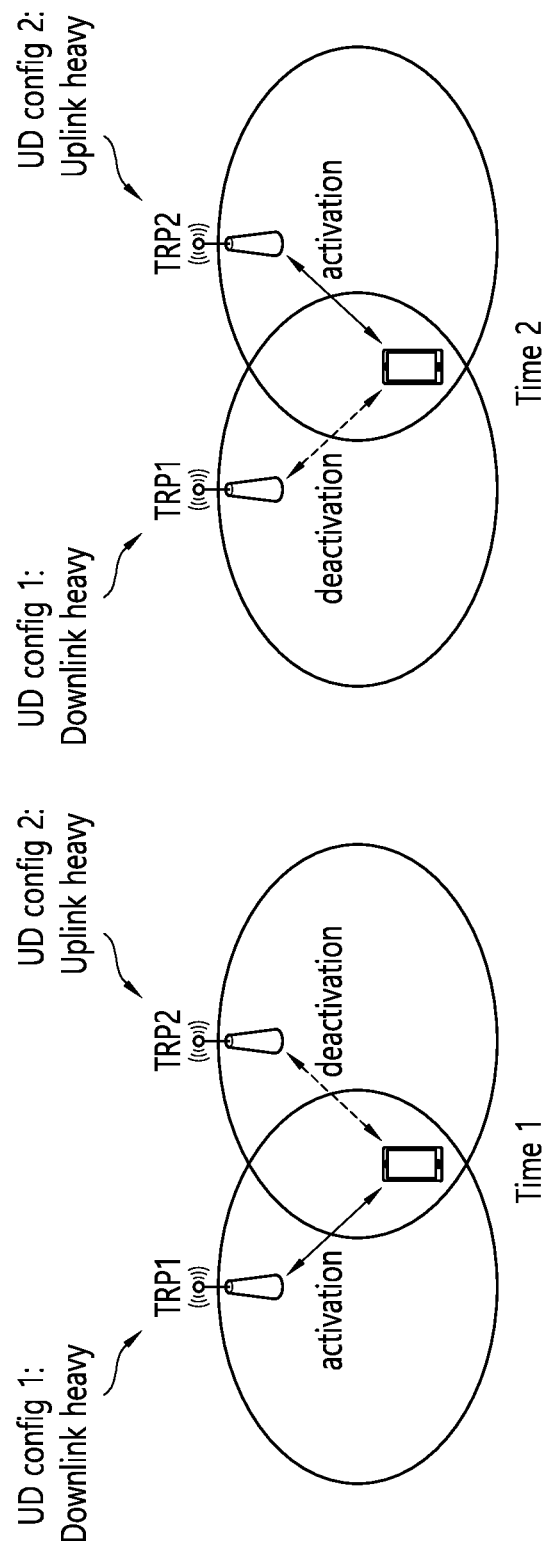
FIG. 14 shows an example of an operation scenario when there are a plurality of TRPs having the same cell ID, and each TRP can be operated with a different UL/DL resource allocation.

FIG. 14 shows an example of an operation scenario when there are a plurality of TRPs having the same cell ID, and each TRP can be operated with a different UL/DL resource allocation.

Referring to FIG. 14, there are a plurality of TRPs (TRP1 and TRP2) having the same cell ID, and each TRP may use a different UL/DL resource allocation. For example, the TRP1 may have a first UL/DL resource allocation (U/D config. 1) in which a DL resource has a high proportion (DL heavy), and the TRP2 may have a second UL/DL resource allocation (U/D config. 2) in which a UL resource has a high proportion (UL heavy). A network may perform transmission/reception through a TRP having an appropriate UL/DL resource allocation, according to a situation of traffic transmitted/received with respect to a UE. For example, when the UE receives DL data in a specific time interval (time 1), the DL data may be received from the TRP1 which has a high proportion of DL resources during a corresponding time interval, and when UL data is transmitted in another specific time interval (time 2), UL data may be transmitted to the TRP2 which has a high proportion of UL resources during a corresponding time interval.

Figure 15:
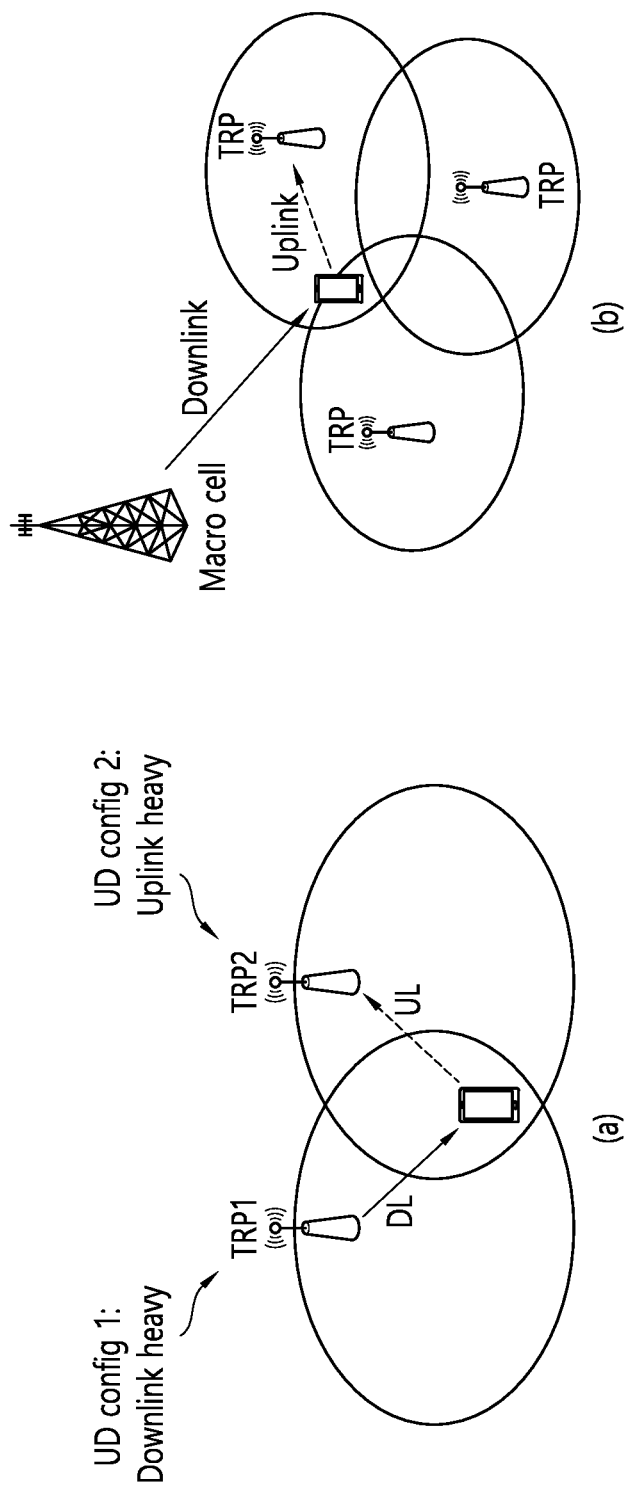
FIG. 15 shows another example of an operation scenario when there are a plurality of TRPs having the same cell ID, and each TRP can be operated with a different UL/DL resource allocation.

FIG. 15 shows another example of an operation scenario when there are a plurality of TRPs having the same cell ID, and each TRP can be operated with a different UL/DL resource allocation.

Referring to FIG. 15, in the presence of a plurality of TRPs having the same cell ID, a specific TRP may perform only downlink transmission or uplink reception.

For example, as shown in FIG. 15(a), from a perspective of a specific UE, a TRP1 may have a UL/DL resource allocation in which only downlink exists (or a first UL/DL resource allocation in which a DL resource has a high proportion), and a TRP2 may have a UL/DL resource allocation in which only uplink exists (or a UL/DL resource allocation in which a UL resource has a high proportion). In this case, the UE may perform downlink reception only from the TRP1, and may perform uplink transmission only to the TRP2.

Alternatively, when considering a situation where uplink coverage is generally pooper than downlink coverage, in order to improve the uplink coverage, as shown in FIG. 15(b), the UE may perform downlink reception from a macro cell and may perform uplink transmission to a neighboring TRP located nearby.

As described above, it may be considered that, while maintaining a UL/DL resource allocation used by each TRP, a UE may optionally change a TRP for performing communication, so that a UL/DL resource allocation used by the UE is properly changed. Two methods may be considered as a method of changing the UL/DL resource allocation applied by the UE according to the TRP.

1. Method in which semi-static UL/DL resource allocation different from each TRP (e.g., TDD-UL-DL-ConfigCommon and/or TDD-UL-DL-ConfigDedicated different for each TRP) is provided to one UE.

2. Method in which dynamic UL/DL resource allocation different from each TRP (e.g., a slot format indication based on SFI-DCI) is performed for one UE.

Although a situation where TRPs having the same cell ID have different UL/DL resource allocations is described in the present disclosure, the content of the present disclosure is also applicable to a situation where TRPs having different cell IDs have different UL/DL resource allocations.

In the present disclosure, an environment in which each TRP may have a different semi-static UL/DL resource allocation from a UE perspective is considered in an environment in which there are a plurality of TRPs having the same cell ID.

In addition, in the present disclosure, an environment in which the TRPs may have the same semi-static UL/DL resource allocation from the UE perspective is also considered in the environment in which there are the plurality of TRPs having the same cell ID. In this case, a TRP which performs communication with the UE may be dynamically changed, thereby dynamically changing a UL/DL resource pattern to be applied when the UE performs communication.

When the TRP which performs communication with the UE is changed, a UL/DL resource pattern applied by the UE may be changed to a UL/DL resource pattern used by the TRP by including a semi-static resource pattern configured through SI and RRC and a dynamic resource pattern dynamically configured.

In the present disclosure, for convenience of description, a resource pattern currently applied by the UE is called an activated resource pattern. A TRP which actually performs transmission/reception with respect to the UE by using the activated resource pattern is called an activated TRP. Alternatively, a TRP which actually performs transmission/reception of UE-specific data with respect to the UE even if the same pattern as the activated resource pattern is not used may also be called the activated TRP.

For example, when a TRP1 uses a UL/DL resource pattern 1 and a TRP2 uses a UL/DL resource pattern 2, a dynamically activated TRP may be indicated to the UE. When the TRP1 is indicated to the UE as the activated TRP, the UL/DL resource pattern 1 may be applied as the activated resource pattern, and when the TRP2 is indicated as the activated TRP, the UL/DL resource pattern 2 may be indicated as the activated resource pattern.

Alternatively, for example, an index of the activated resource pattern may be directly indicated. When the UL/DL resource pattern 1 is indicated to the UE as the activated resource pattern, the resource pattern may be applied to perform communication with the TRP1, and when the UL/DL resource pattern 2 is indicated to the UE as the activated resource pattern, the resource pattern may be applied to perform communication with the TRP2.

The activated TRP may operate as a serving TRP of the UE and thus may be used to transmit/receive a cell-specific and UE-specific signal/channel. Alternatively, the UE-specific signal/channel (and some cell-specific signals/channels) may be transmitted/received in the activated TRP, and the cell-specific signal/channel may be transmitted/received in an additional dedicated TRP.

The present disclosure proposes a method of dynamically configuring a resource pattern and a TRP for performing communication, and an operation of transmitting/receiving a control signal/data at a later time by applying a changed resource pattern.

A. Operation in Activated TRP

In the presence of a plurality of TRPs having the same cell ID, one TRP may be configured as an activated TRP at a specific time point and thus a UE may perform communication with the TRP.

The UE may perform all or some of the following operations in the activated TRP.

i) The UE operates by applying a UL/DL resource pattern used in the activated TRP as a resource pattern thereof. In order to use the UL/DL resource pattern used in the activated TRP, the UE needs to know information of the UL/DL resource pattern to be applied. For example, the UL/DL resource pattern may be directly configured in the UE, or an index to be applied may be indicated since a predetermined index exists for each UL/DL resource pattern.

ii) The UE performs PDCCH monitoring from the activated TRP. The PDCCH may be limited to a UE-specific PDCCH. In order to perform the PDCCH monitoring from the TRP, the PDCCH monitoring shall be performed by using a TCI state suitable for the TRP. In this case, a specific method of changing PDCCH monitoring information will be described below.

B Method of Changing PDCCH Monitoring Information

Since an activated TRP which transmits a PDCCH to a UE is dynamically changed, the following method may be used to change information of TCI of a PDCCH monitored by the UE.

(a) The UE may change a search space for monitoring the PDCCH. That is, the UE may turn ON/OFF (perform or not perform) monitoring of a specific PDCCH search space according to activated TRP information (or TCI information). Whether each PDCCH search space is turned ON or OFF may be determined according to the activated TRP information or the TCI information of the search space.

For example, in the presence of a search space 1 and a search space 2, the search space 1 may be composed of a CORESET 1 linked to a TCI 1, and the search space 2 may be composed of a CORESET 2 linked to a TCI 2. In this case, when the activated TRP of the UE is the TRP 1, monitoring of the search space 1 may be turned ON to perform monitoring, and when the activated TRP of the UE is the TRP 2, monitoring of the search space 2 may be turned ON to perform monitoring. In other words, when the activated TRP of the UE is the TRP 1, the search space 2 may be turned OFF not to perform monitoring, and when the activated TRP of the UE is the TRP 2, monitoring of the search space 1 may be turned OFF not to perform monitoring.

(b) A CORESET constituting a search space monitored by the UE may be changed. That is, after configuring a plurality of CORESET that can be linked to one search space, a CORESET to be actually linked may be changed according to activated TRP information or TCI information. A CORESET constituting a PDCCH search space monitored by the UE may be changed to a CORESET linked to a TCI suitable for the activated TRP. For example, there may be a CORESET 1 and a CORESET 2. The CORESET 1 may be linked to the TCI 1, and the CORESET 2 may be linked to the TCI 2. In this case, when the activated TRP of the UE is the TRP 1, a CORESET constituting a search space monitored by the UE may be the CORESET 1, and when the activated TRP of the UE is the TRP 2, the CORESET constituting the search space may be changed to the CORESET 2.

(c) A TCI linked to the CORESET constituting the search space monitored by the UE may be changed. That is, after configuring a plurality of TCI states that can be linked to one CORESET, a TCI state to be actually linked may be changed according to activated TRP information or TCI information. That is, a CORESET constituting a PDCCH search space monitored by the UE may be changed to a TCI suitable for the activated TRP. For example, when the activated TRP of the UE is the TRP 1, a CORESET constituting a search space monitored by the UE may be linked to the TCI 1, and when the activated TRP of the UE is the TRP 2, the CORESET constituting the search space may be changed to the TCI 2.

C. Information Indicated to Change Activated TRP

In regards to a change of an activated TRP, the following indication (information) may be delivered to a UE. Although information of the activated TRP to be changed may be explicitly indicated to the UE, it is also possible that the change of the activated TRP is implicitly indicated through another indication.

(a) Activated TRP Information

In the presence of an index for each activated TRP, the index of the activated TRP may be reported to a UE as information for reporting the activated TRP.

(b) UL/DL Resource Pattern

A UL/DL resource pattern used by a TRP may be reported to the UE. In this case, the UL/DL resource pattern may be directly configured. Alternatively, a pattern may be configured in advance for each pattern index, and a corresponding pattern index may be dynamically indicated to the UE.

(c) PDCCH Monitoring Information

Information required by the UE to perform monitoring of a PDCCH may be configured. For example, information to be indicated may include: 1) a PDCCH search space index, 2) a CORESET index constituting a PDCCH, or 3) a TCI state linked to the CORESET constituting the PDCCH. When such information is indicated, the UE may change a PDCCH monitoring operation.

Although the aforementioned indications may be independently indicated to the UE, it is also possible that the indications are configured as a set (combination) and then are indicated to the UE. For example, the following configuration set may exist.

Configuration set 0={U/D resource pattern index=0, PDCCH CORESET index=0}, configuration set 1={U/D resource pattern index=1, PDCCH CORESET index=1}, . . . , configuration set N={U/D resource pattern index=K, PDCCH CORESET index=M}.

As such, a plurality of configuration sets may be configured in advance, and which configuration set will be applied may be determined or reported through a specific indication. To this end, for example, the following method may be used.

(1) A specific configuration set may be linked according to an activated TRP index. Therefore, when an activated TRP is indicated to a UE, the UE may apply configuration content in the linked configuration set. For example, when an activated TRP 1 is linked to a configuration set 1, if the activated TRP 1 is indicated, the UE applies a UL/DL resource pattern 1 as a UL/DL resource pattern thereof, and applies a CORESET 1 as a CORESET constituting a PDCCH search space.

(2) A configuration set index may be directly indicated to the UE without having to explicitly indicate the activated TRP. For example, when the configuration set 1 is indicated, the UE applies the UL/DL resource pattern 1 as a UL/DL resource pattern thereof, and applies the CORESET 1 as the CORESET constituting the PDCCH search space. In the present disclosure, for convenience of description, the aforementioned indication related to the change of the activated TRP may also be referred to as a 'TRP switching indication'.

Figure 16:
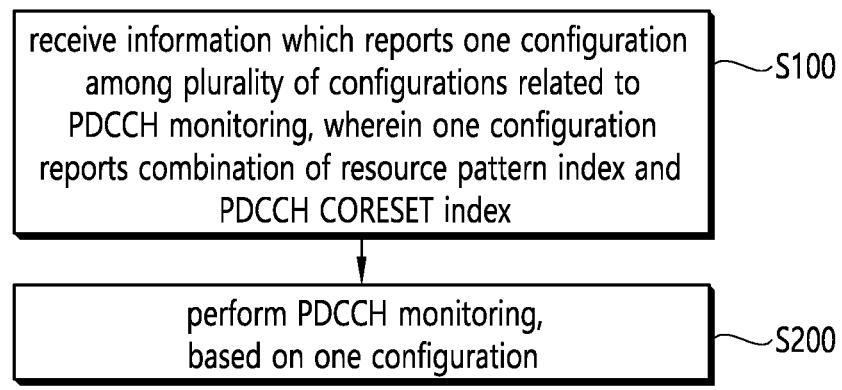
FIG. 16 illustrates a method of monitoring a PDCCH of a UE in a wireless communication system.

FIG. 16 illustrates a method of monitoring a PDCCH of a UE in a wireless communication system.

Referring to FIG. 16, the UE receives information which reports one configuration among a plurality of configurations related to the PDCCH monitoring (S100), and performs the PDCCH monitoring, based on the one configuration (S200). In this case, the one configuration reports a combination of a resource pattern index and a PDCCH control resource set (CORESET) index.

Herein, the resource pattern index may report a location (e.g., a UL/DL resource pattern) of an uplink resource and downlink resource in a specific resource unit (a frame, a subframe, or a slot), and the PDCCH CORESET index may report a CORESET for performing the PDCCH monitoring. The UE may perform the PDCCH monitoring in the CORESET in the downlink resource.

The PDCCH monitoring may be monitoring of a PDCCH transmitted by any one of a plurality of transmit-receive points (TRPs) having the same cell ID. Each of the plurality of TRPs may provide a semi-static resource allocation of a different resource pattern.

The UE may perform communication with only any one of the plurality of TRPs at a specific time point.

The UE may receive the information which reports the one configuration from a first TRP, and may perform communication with a second TRP according to the resource pattern index and PDCCH CORESET index reported by the information. The information may be explicitly provided by a specific field in a downlink grant or uplink grant, and the information may be implicitly provided based on a resource in which a downlink grant or an uplink grant is detected.

Figure 17:
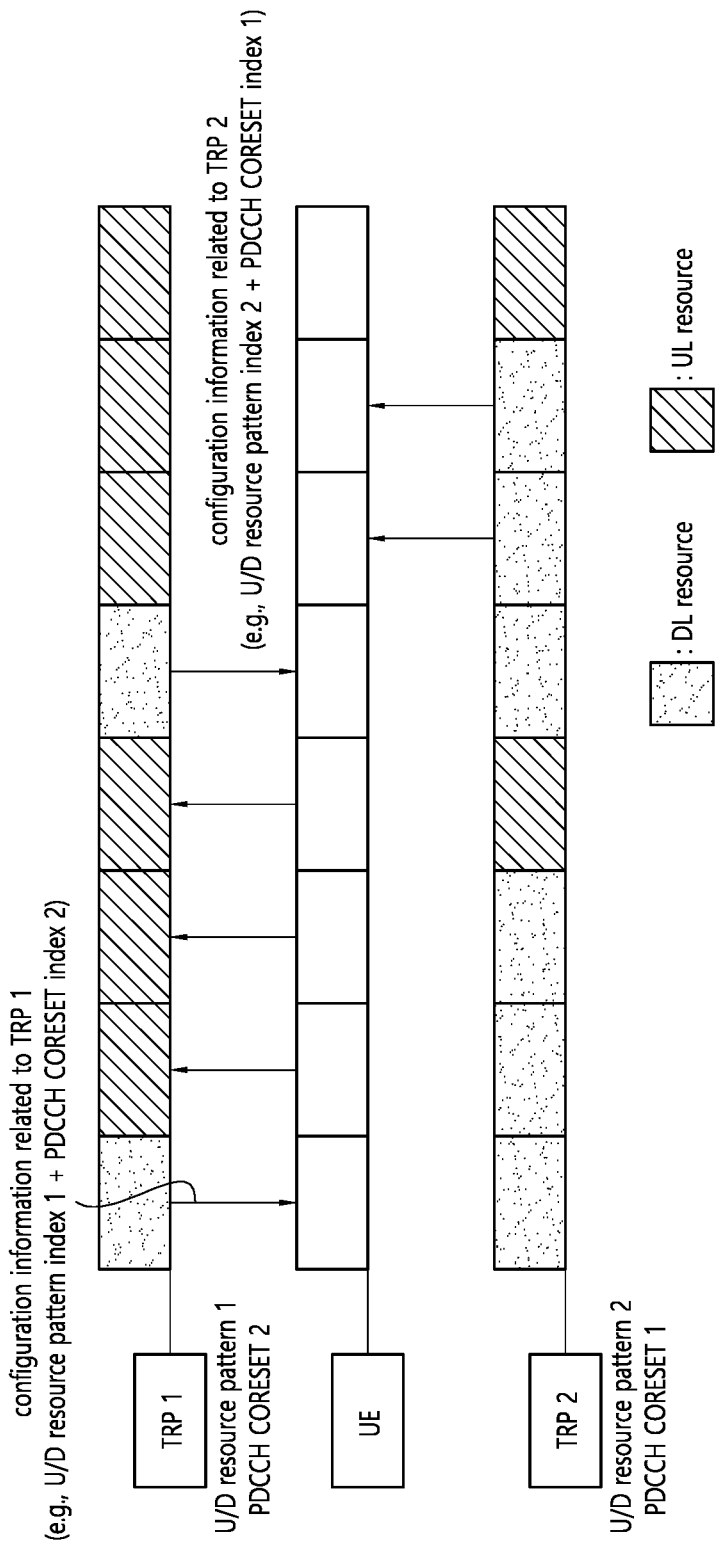
FIG. 17 is an example of operating a UE and TRPs according to the method of FIG. 16.

FIG. 17 is an example of operating a UE and TRPs according to the method of FIG. 16.

Referring to FIG. 17, the UE may use resources based on a U/D resource pattern index 1 (a resource pattern having more UL resources than DL resources) and monitor a PDCCH in a CORESET indicated by a PDCCH CORESET index 2 to perform communication with a TRP 1.

Then, the TRP 1 may provide the UE with configuration information related to a TRP 2. For example, if a transmission/reception pattern is to be changed in such a manner that the UE frequently performs downlink reception while frequently performing uplink transmission, the TRP 1 provides the UE with control information related to the TRP 2 which provides a resource pattern having more downlink resources than uplink resources (for example, information which reports a combination of a U/D resource pattern index 2 and a PDCCH CORESET index 1).

When the U/D resource pattern index 2 is applied at a later time, the UE may perform PDCCH monitoring in a CORESET indicated by the PDCCH CORESET index 1, in a resource configured as a downlink resource. Then, as a result, a TRP change (TRP switching) from the TRP 1 to the TRP 2 is performed.

Figure 18:
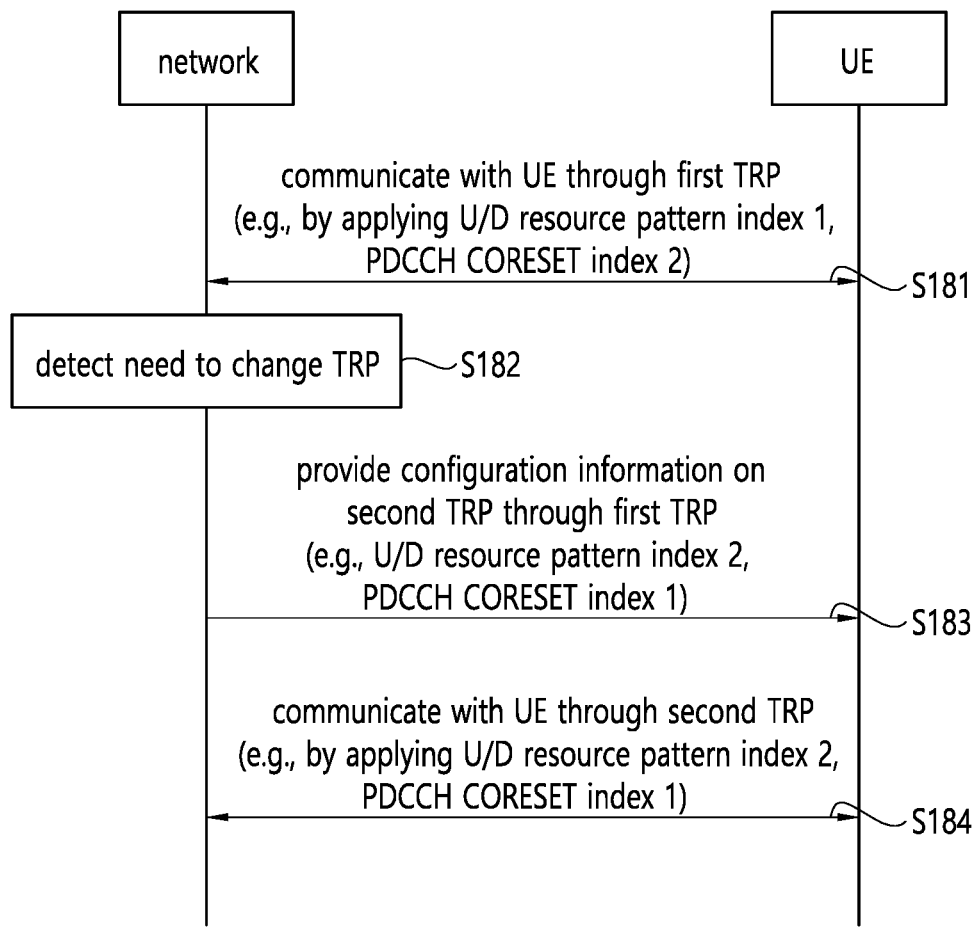
FIG. 18 is an example of an operation between a UE and a network according to the method of FIG. 16.

FIG. 18 is an example of an operation between a UE and a network according to the method of FIG. 16.

Referring to FIG. 18, the network may perform communication with the UE through a first TRP (S181). The UE may apply a semi-static U/D resource pattern (allocation) based on a UL resource pattern index 1 which reports a U/D resource pattern of the first TRP, and may monitor a PDCCH in a CORESET based on a PDCCH CORESET index 2 (S181).

The network may detect a need to change a TRP (S182). For example, if the UE transmits a scheduling request for uplink transmission or if there is an increase in data to be transmitted by the network to the UE, the network may detect the need to change the TRP.

Upon detecting the need to change the TRP, the network provides configuration information on a second TRP through the first TRP (S183). The configuration information on the second TRP may report, for example, a combination of a U/D resource pattern index 2 and a PDCCH CORESET index 1.

Thereafter, the UE and the network may perform communication through the second TRP (S184). That is, the UE may apply a semi-static U/D resource pattern (allocation) based on the UL resource pattern index 2 which reports a U/D resource pattern of the second TRP, and may monitor a PDCCH in a CORESET based on the PDCCH CORESET index 1.

D. TRP which reports change information of activated TRP (i.e., TRP switching indication)

The TRP switching indication may be received from the following TRP.

Alt 1. Activated TRP: A UE may receive the change information of the activated TRP from the activated TRP performing communication.

Alt 2. Cell-specific PDCCH transmission TRP: The UE may receive the change information of the activated TRP from a TRP for transmitting a cell-specific PDCCH to the UE.

Between the activated TRP and the TRP for transmitting the cell-specific PDCCH, which TRP will report the change information of the activated TRP (i.e., TRP switching indication) to the UE may be pre-determined, or may be configured by a network (through a higher layer signal such as RRC or a physical layer signal such as DCI).

E. Method of Indicating Change Information of Activated TRP

Specifically, change information of an activated TRP (i.e., a TRP switching indication) may be indicated to a UE as follows.

Alt 1. An explicit field may be added in a DL grant and/or a UL grant to indicate the change information of the activated TRP (i.e., TRP switching indication information). That is, a new specific field which has not existed before may be added to DCI, and the TRP switching indication information may be explicitly indicated through the specific field.

Alt 2. The change information of the activated TRP (i.e., TRP switching indication information) may be determined according to a resource in which a DL grant and/or a UL grant are detected. Specifically, for example, it may be determined as follows.

Alt 2.1. The TRP switching indication information may be determined according to an index of a PDCCH search space in which a DL grant and/or a UL grant are detected.

Alt 2.2. The TRP switching indication information may be determined according to an index of a CORESET constituting a PDCCH in which a DL grant and/or a UL grant are detected.

Alt 2.3. The TRP switching indication information may be determined according to a TCI state linked to the CORESET constituting the PDCCH in which the DL grant and/or the UL grant are detected.

For example, after a corresponding relation between a TRP and at least one of the index of the PDCCH search space in which the DL grant and/or the UL grant are detected, the CORESET index, and the TCI state is reported to the UE in advance, when a currently activated TRP is to be changed, the DL grant and/or the UL grant may be transmitted by using the PDCCH search space index, CORESET index, TCI state, or the like corresponding to an after-change TRP. The UE may know the after-change TRP, based on which PDCCH search space index, CORESET index, and TCI state are used to detect the DL grant and/or the UL grant.

Alt 3. The TRP switching indication information may be determined according to a value of a TCI field transmitted by being included in the DL grant and/or the UL grant. That is, the TRP switching indication information may be implicitly indicated according to a value of the existing specific field included in DCI. For example, when PDCCH monitoring information is linked according to TCI information of PDSCH/PUSCH, if the UE knows the TCI information of PDSCH/PUSCH, the PDCCH monitoring information may be implicitly determined.

Alt 4. The change information of the activated TRP (i.e., TRP switching indication information) may be determined according to whether a received PDCCH is the DL grant or the UL grant. For example, when the DL grant is transmitted, a TRP 0 may be determined as the activated TRP, and when the UL grant is transmitted, a TRP 1 may be determined as the activated TRP. Alternatively, when the DL grant is transmitted, a configuration set 0 may be determined as a configuration set to be applied by the UE, and when the UL grant is transmitted, a configuration set 1 may be determined as the configuration set to be applied by the UE. To this end, a configuration set to be applied when the DL/UL grant is received and a configuration set to be applied when the UL grant is received may be configured in advance in the UE.

Alt 5. When the UE receives the DL grant and/or the UL grant, TRP switching may be performed when data reception is impossible in a configured data transmission OFDM symbol. For example, in the TRP 0, OFDM symbols #0 to #9 may be configured as downlink resources and OFDM symbols #10 to #13 may be determined as uplink resources, and in the TRP 1, OFDM symbols #0 to #3 may be configured as downlink resources and OFDM symbols #4 to #13 may be determined as uplink resources. In this case, it may be indicated to the UE that a PUSCH will be transmitted in the OFDM symbols #6 to #13 through a UL grant. In this case, in the TRP 0, since some OFDM symbol regions of the OFDM symbols #6 to #13 are downlink resources, the UE cannot transmit a PUSCH with a resource indicated through the TRP 0. However, in the TRP 1, since all OFDM symbol regions of the OFDM symbols #6 to #13 are uplink resources, PUSCH transmission is possible. In this case, the UE may transmit the PUSCH by determining that the TRP 1 capable of transmitting the PUSCH in all resources indicated to transmit the PUSCH is an activated TRP thereof. If data transmission/reception is possible without having to change the activated TRP, a currently activated TRP may be maintained.

Alt 6. Additional DCI may be used to report TRP switching indication information of the UE. The DCI may be UE-specific DCI or UE group-specific DCI.

Figure 19:
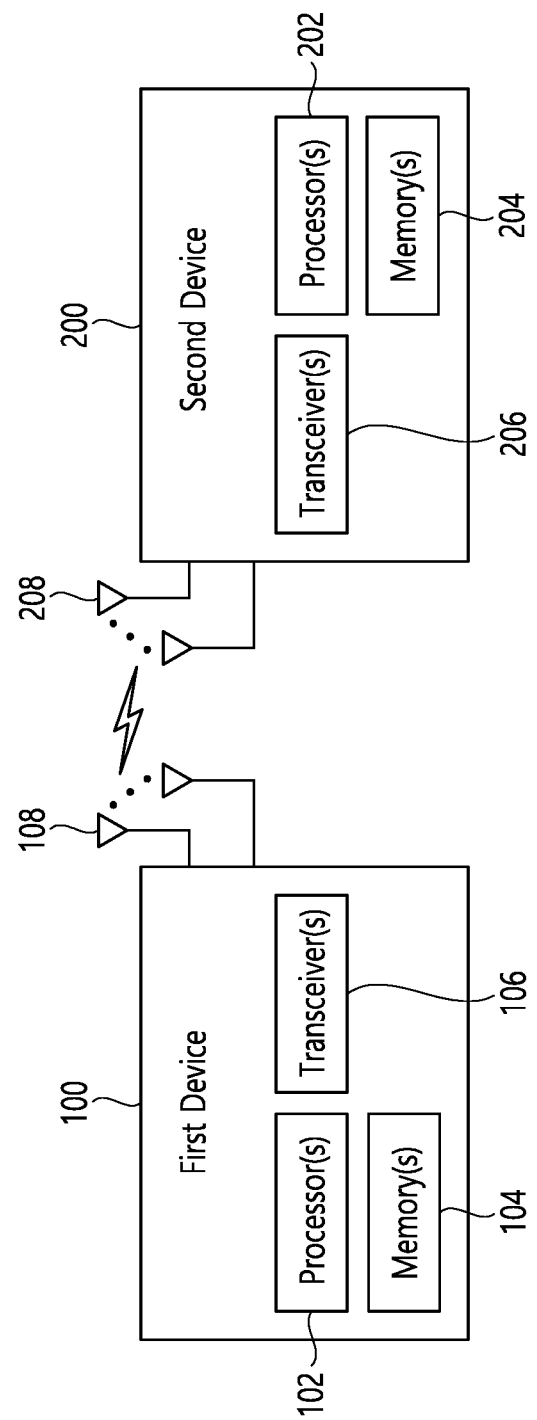
FIG. 19 illustrates a wireless device applicable to the present specification.

FIG. 19 illustrates a wireless device applicable to the present specification.

Referring to FIG. 19, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processor 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The one or more processors 102 and 202 may be implemented with at least one computer readable medium (CRM) including instructions to be executed by at least one processor.

That is, at least one computer readable medium (CRM) having an instruction to be executed by at least one processor to perform operations includes receiving information which reports one configuration among a plurality of configurations related to the PDCCH monitoring, and performing the PDCCH monitoring, based on the one configuration. The one configuration reports a combination of a resource pattern index and a PDCCH control resource set (CORESET) index.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
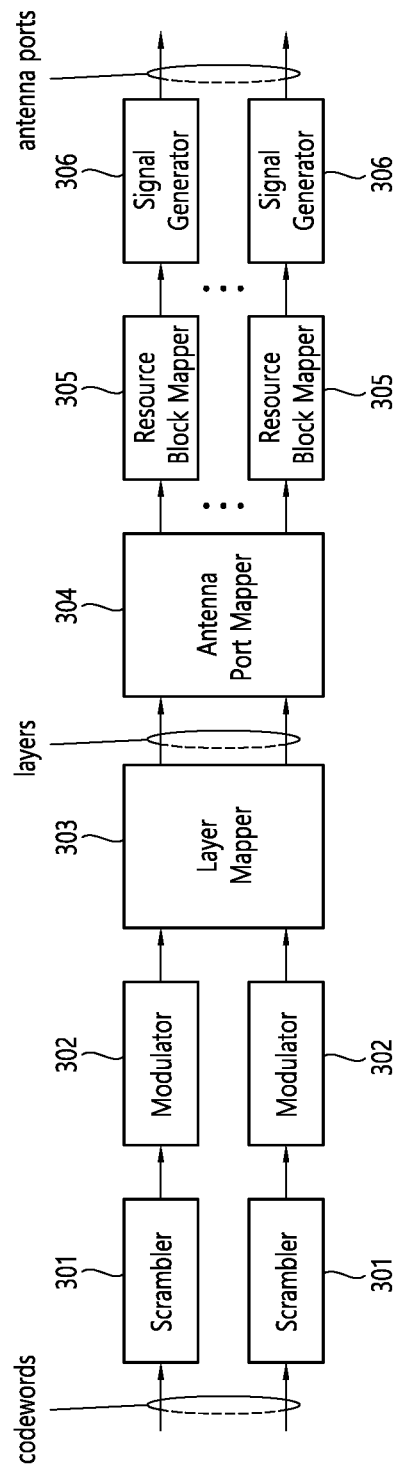
FIG. 20 shows an example of a structure of a signal processing module.

FIG. 20 shows an example of a structure of a signal processing module. Herein, signal processing may be performed in the processors 102 and 202 of FIG. 19.

Referring to FIG. 20, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 21:
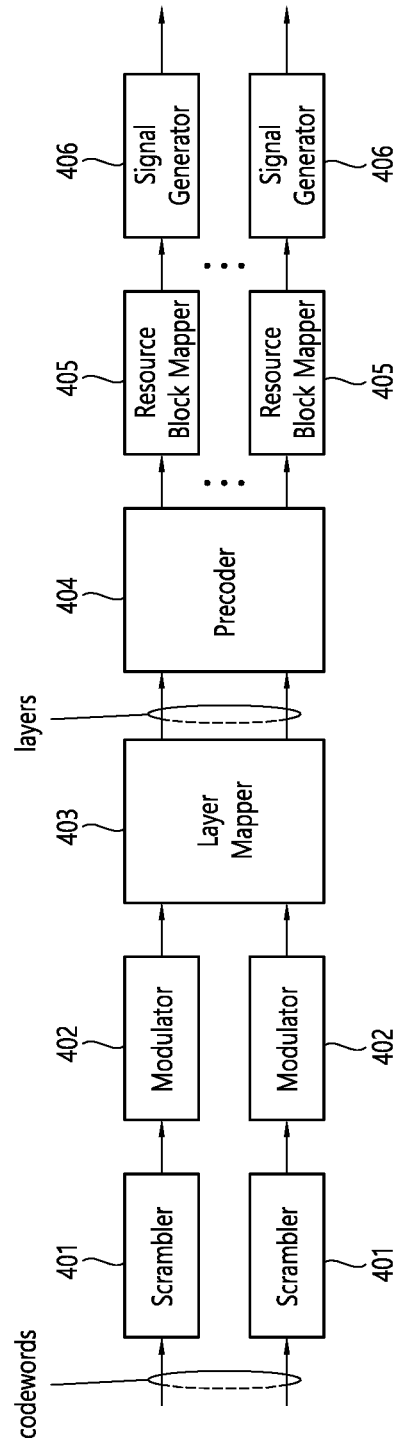
FIG. 21 shows another example of a structure of a signal processing module in a transmitting device.

FIG. 21 shows another example of a structure of a signal processing module in a transmitting device. Herein, signal processing may be performed in a processor of a UE/BS, such as the processors 102 and 202 of FIG. 19.

Referring to FIG. 21, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 22:
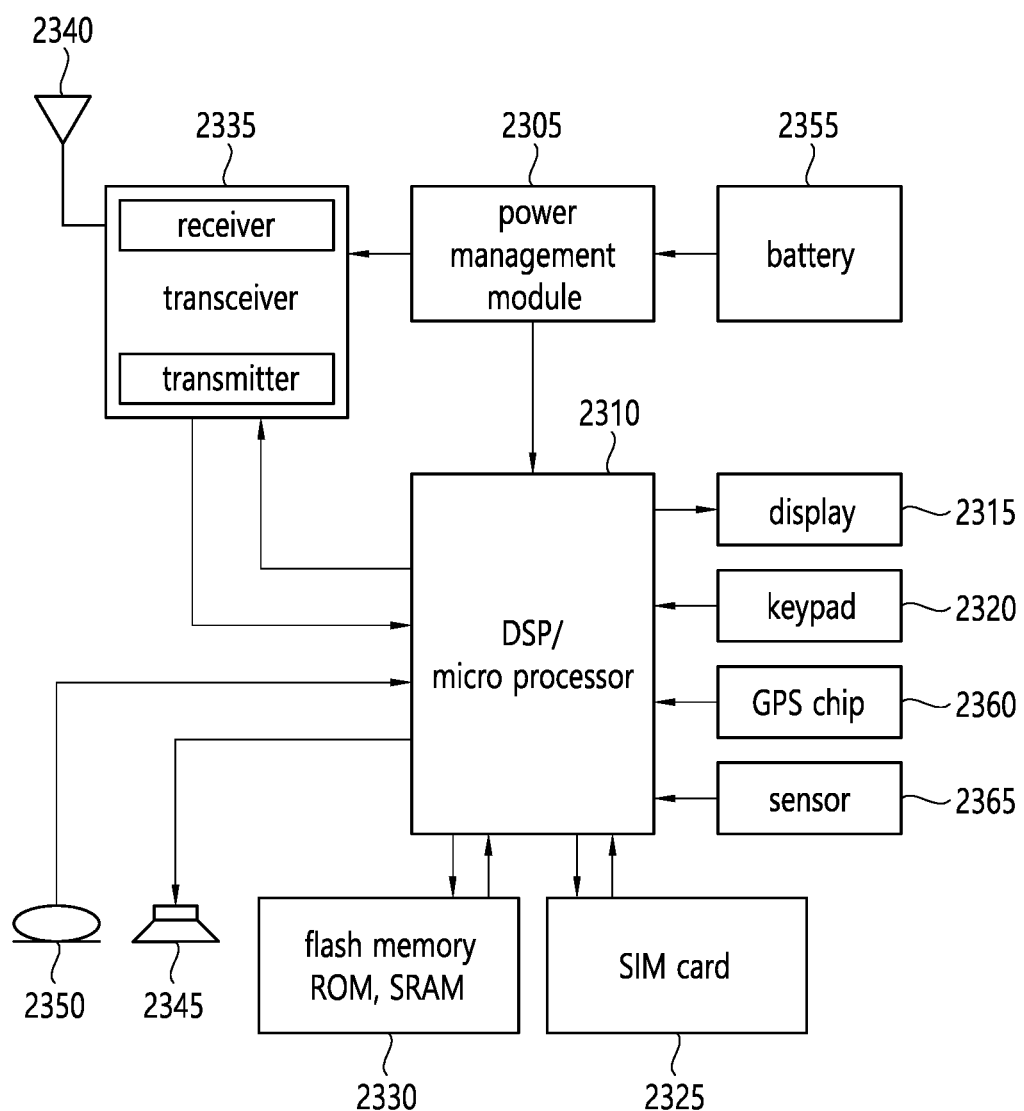
FIG. 22 illustrates an example of a wireless communication device for implementing the present disclosure.

FIG. 22 illustrates an example of a wireless communication device according to an implementation example of the present disclosure.

Referring to FIG. 22, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 22 may be the processors 1811 and 1821 in FIG. 19.

The memory 2330 is connected to the processor 2310 and stores information related to operations of the processor. The memory may be located inside or outside the processor and connected to the processor through various techniques such as wired connection and wireless connection. The memory 2330 in FIG. 22 may be the memories 1813 and 1823 in FIG. 19.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 22 may be the transceivers 1812 and 1822 in FIG. 19.

Although not shown in FIG. 22, various components such as a camera and a universal serial bus (USB) port may be additionally included in the terminal. For example, the camera may be connected to the processor 2310.

FIG. 22 is an example of implementation with respect to the terminal and implementation examples of the present disclosure are not limited thereto. The terminal need not essentially include all the components shown in FIG. 22. That is, some of the components, for example, the keypad 2320, the GPS chip 2360, the sensor 2365 and the SIM card 2325 may not be essential components. In this case, they may not be included in the terminal.

Figure 23:
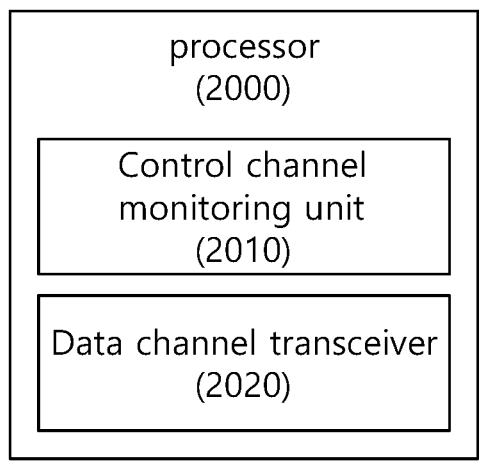
FIG. 23 shows an example of a processor 2000.

FIG. 23 shows an example of a processor 2000.

Referring to FIG. 23, the processor 2000 may include a control channel monitoring unit 2010 and a data channel transceiver 2020. The processor 2000 may execute the methods described in FIG. 16 to FIG. 18 (from a perspective of a receiver). For example, the processor 2000 (more specifically, the control channel monitoring unit 2010) may receive information which reports one configuration among a plurality of configurations related to PDCCH monitoring, and may perform the PDCCH monitoring, based on the one configuration. In this case, the one configuration may report a combination of a resource pattern index and a PDCCH control resource set (CORESET) index. The processor 2000 may monitor the PDCCH in search spaces remaining after excluding the specific search space set from the plurality of search space sets. The resource pattern index may report a location of an uplink resource and downlink resource, and the PDCCH CORESET index may report a CORESET for performing the PDCCH monitoring. The PDCCH monitoring may be performed in the CORESET in the downlink resource. The data channel transceiver 2020 may receive or transmit a data channel (PDSCH, PUSCH) based on the PDCCH. The processor 2000 may be an example of the processors 102 and 202 of FIG. 19.

Figure 24:
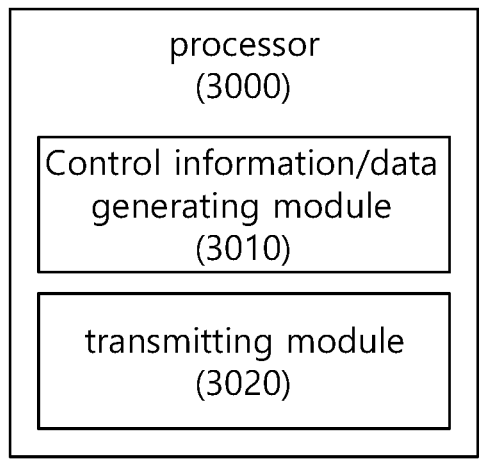
FIG. 24 shows an example of a processor 3000.

FIG. 24 shows an example of a processor 3000.

Referring to FIG. 24, the processor 3000 may include a control information/data generating module 3010 and a transmitting module 3020. The processor 3000 may execute the methods described in FIG. 16 to FIG. 18 (from a perspective of a transmitter). For example, the processor 3000 may generate information which reports one configuration among a plurality of configurations related to PDCCH monitoring to transmit it to a UE. Thereafter, the PDCCH may be transmitted to the UE, based on the one configuration. In this case, the one configuration may report a combination of a resource pattern index and a PDCCH CORESET index. The processor 3000 may be an example of the processors 102 and 202 of FIG. 19.

Figure 25:
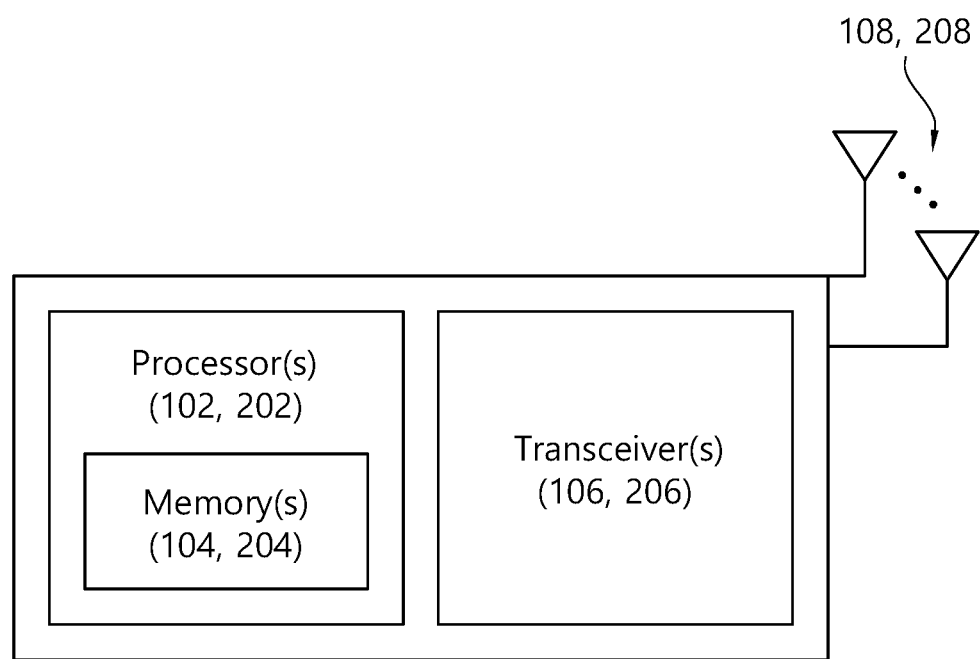
FIG. 25 shows another example of a wireless device.

FIG. 25 shows another example of a wireless device.

Referring to FIG. 25, the wireless device may include one or more processors 102 and 202, one or more memories 104 and 204, and one or more transceivers 108 and 208.

The example of the wireless device described in FIG. 19 is different from the example of the wireless described in FIG. 25 in that the processors 102 and 202 and the memories 104 and 204 are separated in FIG. 19 whereas the memories 104 and 204 are included in the processors 102 and 202 in the example of FIG. 25. That is, the processor and the memory may constitute one chipset.

Figure 26:
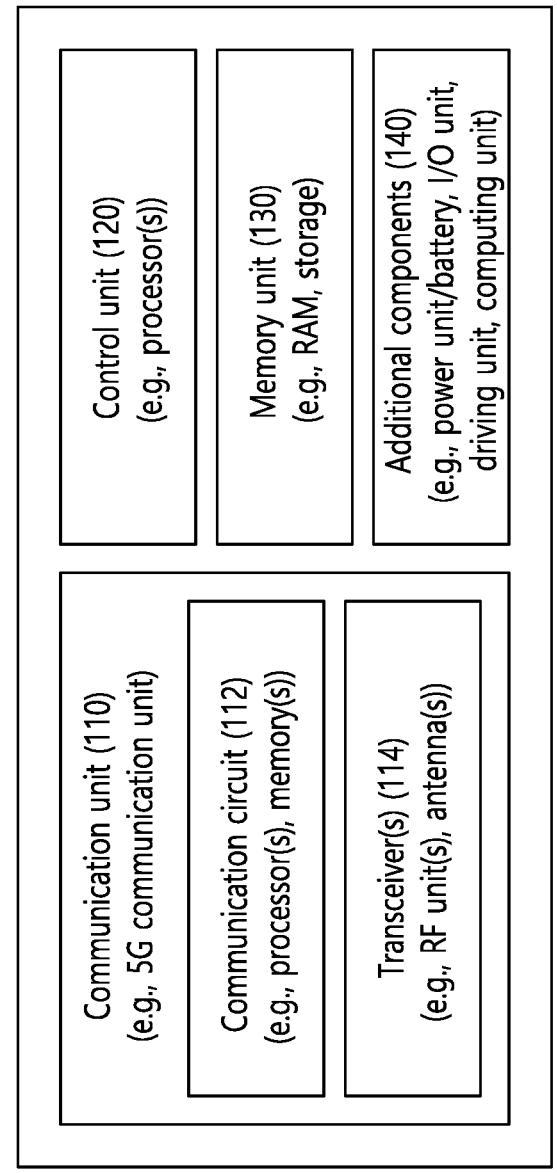
FIG. 26 shows another example of a wireless device applied to the present specification.

FIG. 26 shows another example of a wireless device applied to the present specification. The wireless device may be implemented in various forms according to a use-case/service.

Referring to FIG. 26, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 27:
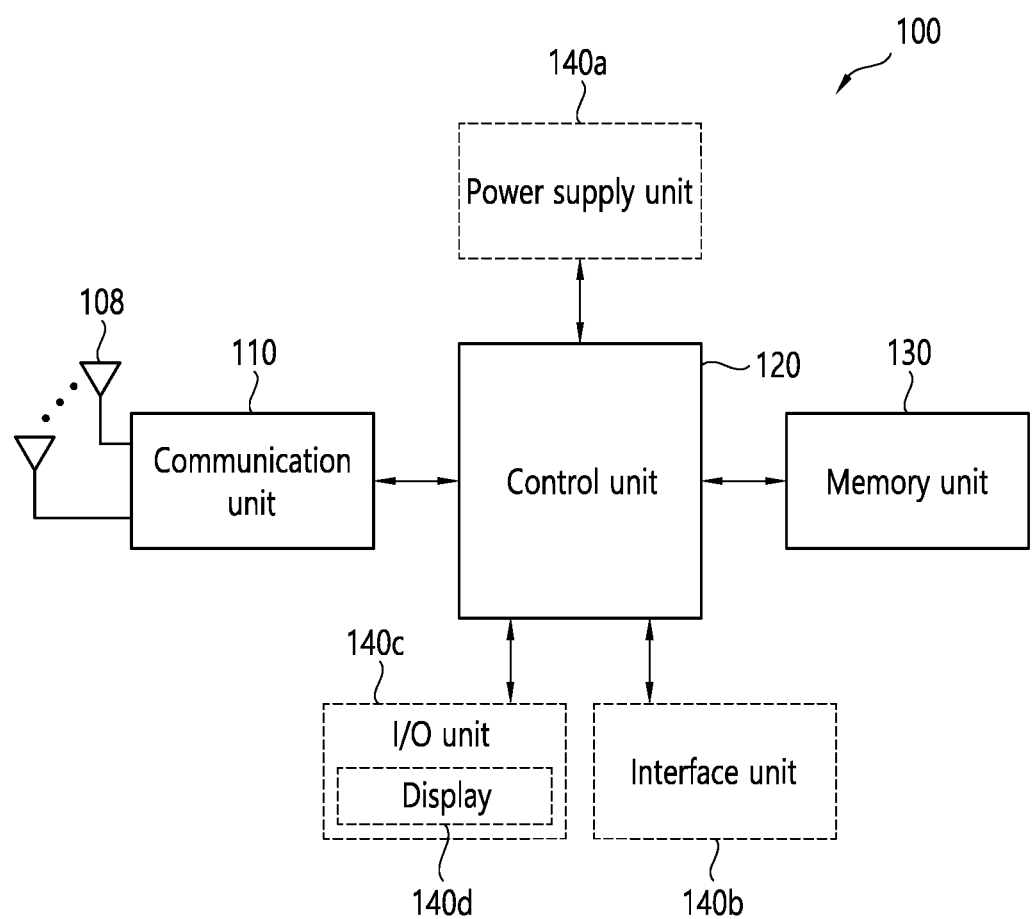
FIG. 27 illustrates a hand-held device applied to the present specification.

FIG. 27 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c respective correspond to the blocks 110 to 130/140 of FIG. 26.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 28:
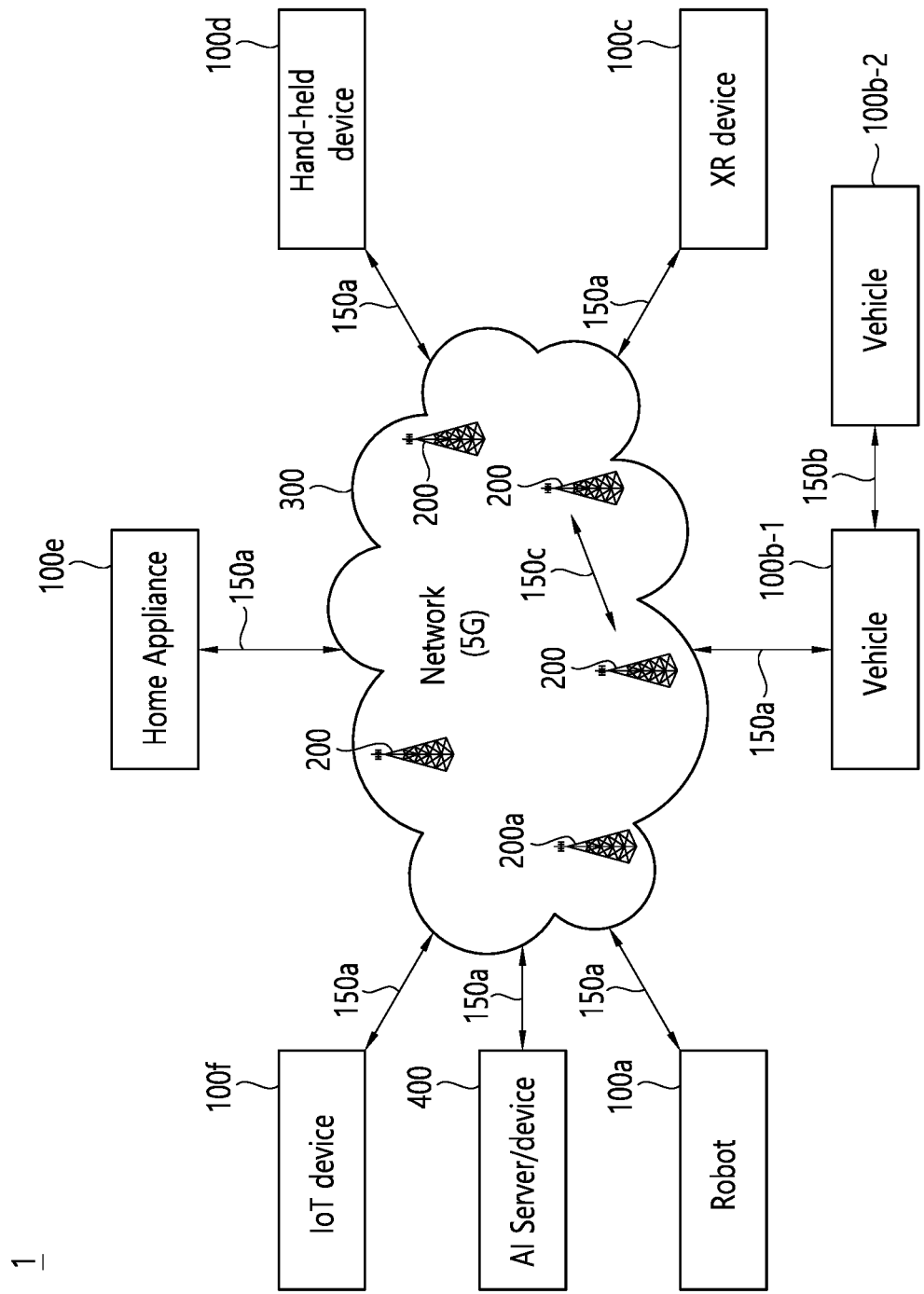
FIG. 28 illustrates a communication system 1 applied to the present specification.

FIG. 28 illustrates a communication system 1 applied to the present specification.

Referring to FIG. 28, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 5. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 5

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 6 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 6

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

FIG. 29 illustrates a vehicle or an autonomous vehicle applicable to the present specification. The vehicle or autonomous vehicle may be implemented by a mobile robot, a car, a train, a manned/unmanned Aerial Vehicle (AV), a ship, etc.

Referring to FIG. 29, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* respectively correspond to the blocks 110/130/140 of FIG. 26.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method for a physical downlink control channel (PDCCH) monitoring of a user equipment (UE) in a wireless communication system, the method comprising:
   receiving, from a first transmit-receive point (TRP), first information regarding a plurality of control resource sets (CORESETs), the first information providing for each CORESET of the plurality of CORESETs:
   i) a CORESET index,
   ii) a PDCCH demodulation reference signal (DM-RS) scrambling sequence initialization value,
   iii) a CORESET time duration in number of symbols,
   iv) a set of resource blocks,
   v) control channel element (CCE)-to-resource element group (REG) mapping parameters,
   vi) an antenna port quasi co-location indicating quasi co-location information of a DM-RS antenna port for PDCCH reception, and
   vii) an indication of presence of transmission configuration indication (TCI) field for a specific downlink control information (DCI) format;
   receiving, from the first TRP, second information which reports a first configuration among a plurality of configurations related to the PDCCH monitoring,
   wherein the first configuration reports a combination of a first resource pattern index and a first PDCCH CORESET index;
   performing a first PDCCH monitoring in a first CORESET indicated by the first PDCCH CORESET index and communicating with the first TRP using a first resource pattern indicated by the first resource pattern index,
   wherein the first resource pattern comprises more downlink resources than uplink resources in a slot;
   transmitting, to the first TRP, a scheduling request for uplink transmission;
   in response to the scheduling request, receiving, from the first TRP, a second configuration for a second TRP,
   wherein the second configuration reports a combination of a second resource pattern index and a second PDCCH CORESET index; and
   performing a second PDCCH monitoring in a second CORESET indicated by the second PDCCH CORESET index and communicating with the second TRP using a second resource pattern indicated by the second resource pattern index,
   wherein the second resource pattern comprises more uplink resources than downlink resources in a slot.

2. The method of claim 1, wherein each of the first resource pattern index and a second resource pattern index reports a location of uplink resources and downlink resources in a slot, and each of the first PDCCH CORESET index and the second PDCCH CORESET index reports a CORESET for performing a PDCCH monitoring.

3. The method of claim 2, wherein the PDCCH monitoring is performed in the CORESET in the downlink resources.

4. The method of claim 1, wherein the PDCCH monitoring is monitoring of a PDCCH transmitted by any one of a plurality of TRPs, the plurality of TRPs including the TRP and the second TRP.

5. The method of claim 4, wherein the plurality of TRPs have a same cell identity (ID).

6. The method of claim 4, wherein each of the plurality of TRPs provides a semi-static resource allocation of a different resource pattern.

7. The method of claim 1, wherein the UE communicates with only one of a plurality of TRPs at a specific time point.

8. A user equipment (UE) comprising:
   a transceiver transmitting and receiving a radio signal; and
   a processor operatively coupled with the transceiver, wherein the processor is configured to:
   receive from a first transmit-receive point (TRP), first information which first information regarding a plurality of control resource sets (CORESETs), the first information providing for each CORESET of the plurality of CORESETs:
   i) a CORESET index,
   ii) a physical downlink control channel (PDCCH) demodulation reference signal (DM-RS) scrambling sequence initialization value,
   iii) a CORESET time duration in number of symbols,
   iv) a set of resource blocks,
   v) control channel element (CCE)-to-resource element group (REG) mapping parameters, vi) an antenna port quasi co-location indicating quasi co-location information of a DM-RS antenna port for PDCCH reception, and vii) an indication of presence of transmission configuration indication (TCI) field for a specific downlink control information (DCI) format;

receive, from the first TRP, second information which reports a first configuration among a plurality of configurations related to a PDCCH monitoring, wherein the first configuration reports a combination of a first resource pattern index and a first PDCCH CORESET index;

perform a first PDCCH monitoring in a first CORESET indicated by the first PDCCH CORESET index and communicate with the first TRP using a first resource pattern indicated by the first resource pattern index, wherein the first resource pattern comprises more downlink resources than uplink resources in a slot;

transmit, to the first TRP, a scheduling request for uplink transmission;

in response to the scheduling request, receive, from the first TRP, a second configuration for a second TRP, wherein the second configuration reports a combination of a second resource pattern index and a second PDCCH CORESET index; and perform a second PDCCH monitoring in a second CORESET indicated by the second PDCCH CORESET index and communicate with the second TRP using a second resource pattern indicated by the second resource pattern index, wherein the second resource pattern comprises more uplink resources than downlink resources in a slot.

9. The UE of claim 8, wherein each of the first resource pattern index and a second resource pattern index reports a location of uplink resources and downlink resources in a slot, and each of the first PDCCH CORESET index and the second PDCCH CORESET index reports a CORESET for performing a PDCCH monitoring.

10. The UE of claim 9, wherein the PDCCH monitoring is performed in the CORESET in the downlink resources.

11. The UE of claim 8, wherein the PDCCH monitoring is monitoring of a PDCCH transmitted by any one of a plurality of TRPs, the plurality of TRPs including the first and TRP and the second TRP.

12. The UE of claim 11, wherein the plurality of TRPs have a same cell identity (ID).

13. The UE of claim 11, wherein each of the plurality of TRPs provide a semi-static resource allocation of a different resource pattern.

14. A method of communicating with a user equipment (UE) in a wireless communication system, the method performed by a network comprising a first transmit-receive point (TRP) and a second TRP and comprising:

transmitting, through the first TRP, first information regarding a plurality of control resource sets (CORESETs), the first information providing for each CORESET of the plurality of CORESETs:

i) a CORESET index,
ii) a physical downlink control channel (PDCCH) demodulation reference signal (DM-RS) scrambling sequence initialization value,
iii) a CORESET time duration in number of symbols,
iv) a set of resource blocks,
v) control channel element (CCE)-to-resource element group (REG) mapping parameters,
vi) an antenna port quasi co-location indicating quasi co-location information of a DM-RS antenna port for PDCCH reception, and
vii) an indication of presence of transmission configuration indication (TCI) field for a specific downlink control information (DCI) format;

transmitting, through the first TRP, second information which reports a first configuration among a plurality of configurations related to a PDCCH monitoring, wherein the first configuration reports a combination of a first resource pattern index and a first PDCCH CORESET index;

transmitting a first PDCCH in a first CORESET indicated by the first PDCCH CORESET index and communicating with the UE through the first TRP using a first resource pattern indicated by the first resource pattern index, wherein the first resource pattern comprises more downlink resources than uplink resources in a slot;

receiving, through the first TRP, a scheduling request for uplink transmission from the UE;

in response to the scheduling request, transmitting, through the first TRP, a second configuration for the second TRP, wherein the second configuration reports a combination of a second resource pattern index and a second PDCCH CORESET index; and transmitting a second PDCCH in a second CORESET indicated by the second PDCCH CORESET index and communicating with the UE through the second TRP using a second resource pattern indicated by the second resource pattern index, wherein the second resource pattern comprises more uplink resources than downlink resources in a slot.

15. A network comprising a first transmit-receive point (TRP) and a second TRP, the network comprising:

a transceiver transmitting and receiving a radio signal; and a processor operatively coupled with the transceiver, wherein the processor is configured to:

transmit, through the first TRP, first information regarding a plurality of control resource sets (CORESETs), the first information providing for each CORESET of the plurality of CORESETs:

i) a CORESET index,
ii) a physical downlink control channel (PDCCH) demodulation reference signal (DM-RS) scrambling sequence initialization value,
iii) a CORESET time duration in number of symbols,
iv) a set of resource blocks,
v) control channel element (CCE)-to-resource element group (REG) mapping parameters,
vi) an antenna port quasi co-location indicating quasi co-location information of a DM-RS antenna port for PDCCH reception, and
vii) an indication of presence of transmission configuration indication (TCI) field for a specific downlink control information (DCI) format;

transmit, through the first TRP, second information which reports a first configuration among a plurality of configurations related to a PDCCH monitoring, wherein the first configuration reports a combination of a first resource pattern index and a first PDCCH CORESET index;

transmit, through the first TRP, second information which reports a first configuration among a plurality of configurations related to a PDCCH monitoring, wherein the first configuration reports a combination of a first resource pattern index and a first PDCCH CORESET index;

transmit a first PDCCH in a first CORESET indicated by the first PDCCH CORESET index and communicate with the UE through the first TRP using a first resource pattern indicated by the first resource pattern index, wherein the first resource pattern comprises more downlink resources than uplink resources in a slot;

receive, through the first TRP, a scheduling request for uplink transmission from the UE;

in response to the scheduling request, transmit, through the first TRP, a second configuration for the second TRP, wherein the second configuration reports a combination of a second resource pattern index and a second PDCCH CORESET index; and transmit a second PDCCH in a second CORESET indicated by the second PDCCH CORESET index and communicate with the UE through the second TRP using a second resource pattern indicated by the second resource pattern index, wherein the second resource pattern comprises more uplink resources than downlink resources in a slot.

16. A non-transitory computer readable medium (CRM) having an instruction to be executed by at least one processor to perform operations includes:

receiving, from a first transmit-receive point (TRP), first information regarding a plurality of control resource sets (CORESETs), the first information providing for each CORESET of the plurality of CORESETs:
  i) a CORESET index,
  ii) a physical downlink control channel (PDCCH) demodulation reference signal (DM-RS) scrambling sequence initialization value,
  iii) a CORESET time duration in number of symbols,
  iv) a set of resource blocks,
  v) control channel element (CCE)-to-resource element group (REG) mapping parameters,
  vi) an antenna port quasi co-location indicating quasi co-location information of a DM-RS antenna port for PDCCH reception, and
  vii) an indication of presence of transmission configuration indication (TCI) field for a specific downlink control information (DCI) format;

receiving, from the first TRP, second information which reports a first configuration among a plurality of configurations related to the PDCCH monitoring, wherein the first configuration reports a combination of a first resource pattern index and a first PDCCH CORESET index; and performing a first PDCCH monitoring in a first CORESET indicated by the first PDCCH CORESET index and communicating with the first TRP using a first resource pattern indicated by the first resource pattern index, wherein the first resource pattern comprises more downlink resources than uplink resources in a slot;

transmitting, to the first TRP, a scheduling request for uplink transmission;

in response to the scheduling request, receiving, from the first TRP, a second configuration a the second TRP, wherein the second configuration reports a combination of a second resource pattern index and a second PDCCH CORESET index; and performing a second PDCCH monitoring in a second CORESET indicated by the second PDCCH CORESET index and communicating with the second TRP using a second resource pattern indicated by the second resource pattern index, wherein the second resource pattern comprises more uplink resources than downlink resources in a slot.

17. An apparatus of a wireless communication system, the apparatus comprising:

a processor; and a memory coupled with the processor, wherein the processor is configured to:

receive, from a first transmit-receive point (TRP), first information regarding a plurality of control resource sets (CORESETs), the first information providing for each CORESET of the plurality of CORESETs:
  i) a CORESET index,
  ii) a physical downlink control channel (PDCCH) demodulation reference signal (DM-RS) scrambling sequence initialization value,
  iii) a CORESET time duration in number of symbols,
  iv) a set of resource blocks,
  v) control channel element (CCE)-to-resource element group (REG) mapping parameters,
  vi) an antenna port quasi co-location indicating quasi co-location information of a DM-RS antenna port for PDCCH reception, and
  vii) an indication of presence of transmission configuration indication (TCI) field for a specific downlink control information (DCI) format;

receive, from the first TRP, second information which reports a first configuration among a plurality of configurations related to a PDCCH monitoring, wherein the first configuration reports a combination of a first resource pattern index and a first PDCCH CORESET index; and perform a first PDCCH monitoring in a first CORESET indicated by the first PDCCH CORESET index and communicate with the first TRP using a first resource pattern indicated by the first resource pattern index, wherein the first resource pattern comprises more downlink resources than uplink resources in a slot;

transmit, to the first TRP, a scheduling request for uplink transmission;

in response to the scheduling request, receive, from the first TRP, a second configuration a the second TRP, wherein the second configuration reports a combination of a second resource pattern index and a second PDCCH CORESET index; and perform a second PDCCH monitoring in a second CORESET indicated by the second PDCCH CORESET index and communicate with the second TRP using a second resource pattern indicated by the second resource pattern index, wherein the second resource pattern comprises more uplink resources than downlink resources in a slot.

* * * * *